United States Patent
Sung et al.

(10) Patent No.: US 9,626,980 B2
(45) Date of Patent: *Apr. 18, 2017

(54) METHOD OF QUANTIZING LINEAR PREDICTIVE CODING COEFFICIENTS, SOUND ENCODING METHOD, METHOD OF DE-QUANTIZING LINEAR PREDICTIVE CODING COEFFICIENTS, SOUND DECODING METHOD, AND RECORDING MEDIUM AND ELECTRONIC DEVICE THEREFOR

(71) Applicant: SAMSUNG ELECTRONICS CO., LTD., Suwon-si (KR)

(72) Inventors: Ho-sang Sung, Yongin-si (KR); Eun-mi Oh, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 14/624,948

(22) Filed: Feb. 18, 2015

(65) Prior Publication Data

US 2015/0162017 A1 Jun. 11, 2015

Related U.S. Application Data

(63) Continuation of application No. 13/453,386, filed on Apr. 23, 2012, now Pat. No. 8,977,544.

(Continued)

(51) Int. Cl.
*G10L 19/032* (2013.01)
*G10L 19/06* (2013.01)
(Continued)

(52) U.S. Cl.
CPC ............ *G10L 19/032* (2013.01); *G10L 19/06* (2013.01); *G10L 19/18* (2013.01); *H04N 19/124* (2014.11);
(Continued)

(58) Field of Classification Search
CPC ....................................................... G10L 19/32
(Continued)

(56) References Cited

U.S. PATENT DOCUMENTS 5,699,485 A 12/1997 Shoham
5,864,800 A 1/1999 Iami et al.
(Continued)

FOREIGN PATENT DOCUMENTS

CN 1424712 A 6/2003
CN 1625681 A 6/2005
(Continued)

OTHER PUBLICATIONS

T. Taniguchi, S. Unagami and R. M. Gray, "Multimode coding: application to CELP," Acoustics, Speech, and Signal Processing, 1989. ICASSP-89., 1989 International Conference on, Glasgow, 1989, pp. 156-159 vol. 1.*

(Continued)

*Primary Examiner* — Douglas Godbold
(74) *Attorney, Agent, or Firm* — Sughrue Mion, PLLC

(57) ABSTRACT

A quantizing method is provided that includes quantizing an input signal by selecting one of a first quantization scheme not using an inter-frame prediction and a second quantization scheme using the inter-frame prediction, in consideration of one or more of a prediction mode, a predictive error and a transmission channel state.

4 Claims, 28 Drawing Sheets

Related U.S. Application Data

(60) Provisional application No. 61/481,874, filed on May 3, 2011, provisional application No. 61/477,797, filed on Apr. 21, 2011.

(51) Int. Cl.

| | |
|---|---|
| *G10L 19/18* | (2013.01) |
| *H04N 19/159* | (2014.01) |
| *H04N 19/124* | (2014.01) |
| *G10L 19/07* | (2013.01) |
| *G10L 19/22* | (2013.01) |
| *H04N 19/137* | (2014.01) |
| *H04N 19/164* | (2014.01) |

(52) U.S. Cl.
CPC ............ *H04N 19/159* (2014.11); *G10L 19/07* (2013.01); *G10L 19/22* (2013.01); *H04N 19/137* (2014.11); *H04N 19/164* (2014.11)

(58) Field of Classification Search
USPC ................ 704/200–201, 219, 221–222, 230, 704/500–501
See application file for complete search history.

(56) References Cited

U.S. PATENT DOCUMENTS

| | | | | |
|---|---|---|---|---|
| 5,956,672 | A | 9/1999 | Serizawa | |
| 5,966,688 | A * | 10/1999 | Nandkumar | G10L 19/07 704/219 |
| 6,735,567 | B2 * | 5/2004 | Gao | G10L 19/167 704/220 |
| 6,961,698 | B1 * | 11/2005 | Gao | G10L 19/167 341/67 |
| 7,106,228 | B2 | 9/2006 | Bessette et al. | |
| 7,149,683 | B2 | 12/2006 | Jelinek | |
| 7,222,069 | B2 * | 5/2007 | Suzuki | G10L 19/16 704/201 |
| 7,630,890 | B2 * | 12/2009 | Son | G10L 19/06 704/219 |
| 8,265,142 | B2 | 9/2012 | Shimizu et al. | |
| 8,271,272 | B2 * | 9/2012 | Ehara | G10L 19/07 375/240.03 |
| 8,630,862 | B2 * | 1/2014 | Geiger | G10L 19/0212 704/219 |
| 2002/0077812 | A1 * | 6/2002 | Suzuki | G10L 19/16 704/230 |
| 2002/0091523 | A1 | 7/2002 | Makinen et al. | |
| 2002/0173951 | A1 | 11/2002 | Ehara | |
| 2004/0006463 | A1 | 1/2004 | Al-Naimi et al. | |
| 2004/0030548 | A1 * | 2/2004 | El-Maleh | G10L 19/002 704/230 |
| 2004/0230429 | A1 * | 11/2004 | Son | G10L 19/0212 704/230 |
| 2006/0198538 | A1 | 9/2006 | Malvar et al. | |
| 2006/0251261 | A1 | 11/2006 | Christoph | |
| 2007/0233473 | A1 * | 10/2007 | Lee | G10L 19/032 704/219 |
| 2008/0077401 | A1 * | 3/2008 | Jabri | G10L 19/12 704/219 |
| 2009/0136052 | A1 | 5/2009 | Hohlfeld et al. | |
| 2009/0198491 | A1 * | 8/2009 | Sato | H03M 7/3082 704/219 |
| 2009/0245351 | A1 | 10/2009 | Watanabe | |
| 2010/0010812 | A1 * | 1/2010 | Makinen | G10L 19/22 704/221 |
| 2010/0118937 | A1 | 5/2010 | Shimizu et al. | |
| 2011/0202354 | A1 * | 8/2011 | Grill | G10L 19/008 704/500 |
| 2012/0271629 | A1 * | 10/2012 | Sung | G10L 19/06 704/219 |
| 2012/0278069 | A1 * | 11/2012 | Sung | G10L 19/06 704/219 |

FOREIGN PATENT DOCUMENTS

| | | |
|---|---|---|
| CN | 1630376 A | 6/2005 |
| CN | 1947174 A | 4/2007 |
| CN | 101395661 A | 3/2009 |
| CN | 102177426 A | 9/2011 |
| EP | 1450352 A2 | 8/2004 |
| EP | 2144171 A1 | 1/2010 |
| EP | 2144230 A1 | 1/2010 |
| EP | 2700072 | 2/2014 |
| EP | 2700072 A2 | 2/2014 |
| JP | 8-211900 A | 8/1996 |
| JP | 9-190197 A | 7/1997 |
| JP | 2003-22099 A | 1/2003 |
| JP | 2004-252462 A | 9/2004 |
| JP | 2006-510947 A | 3/2006 |
| JP | 2009-532976 A | 9/2009 |
| JP | 2010-517065 A | 5/2010 |
| KR | 10-2008-0092770 A | 10/2008 |
| RU | 2005123381 A | 1/2006 |
| RU | 2009133184 A | 3/2011 |
| WO | 03103151 A1 | 12/2003 |
| WO | 2007106637 A2 | 9/2007 |
| WO | 2010/003564 A1 | 1/2010 |
| WO | 2011/042464 A1 | 4/2011 |
| WO | 2012/144877 A2 | 10/2012 |
| WO | 2012144878 A2 | 10/2012 |

OTHER PUBLICATIONS

T. Taniguchi, S. Unagami and R. M. Gray, "Multimode coding: application to CELP," International Conference on Acoustics, Speech, and Signal Processing Glasgow, 1989, pp. 156-159 vol. 1.*
ITU-T G.718, "Frame error robust narrow-band and wideband embedded variable bit-rate coding of speech and audio from 8-32 kbit/s", Jun. 2008, 257 pages.
Communication dated Nov. 28, 2012 issued by the International Searching Authority in counterpart International Application No. PCT/KR2012/003128.
Communication dated Nov. 29, 2012 issued by International Searching Authority in counterpart International Application No. PCT/KR2012/003127.
Communication from the European Patent Office issued Apr. 28, 2014 in a counterpart European Application No. 12774337.5.
Communication dated Mar. 9, 2015 issued by The State Intellectual Property Office of P.R. China in counterpart Chinese Application No. 201280030913.7.
Communication dated Jun. 2, 2015 issued by European Patent Office in counterpart European Application No. 12773932.4.
Communication dated May 29, 2015 issued by European Patent Office in counterpart European Application No. 12774337.5.
Communication dated May 13, 2015 issued by The State Intellectual Property Office of P.R. China in counterpart Chinese Application No. 201280031031.2.
Communication dated Dec. 21, 2015, issued by the European Patent Office in counterpart European Application No. 12773932.4.
Communication dated Jun. 7, 2016, issued by the Japanese Patent Office in counterpart Japanese Patent Application No. 2014-506340.
Communication dated Jun. 7, 2016, issued by the Japanese Patent Office in counterpart Japanese Patent Application No. 2014-506341.
Communication dated Aug. 11, 2016, issued by the Federal Service for Intellectual Property in counterpart Russian Patent Application No. 2013151798.
Communication dated Jan. 11, 2017 issued by the Taiwan Intellectual Property Office in counterpart Taiwanese Patent Application No. 101114409.
Communication dated Jan. 11, 2017 issued by the Taiwan Intellectual Property Office in counterpart Taiwanese Patent Application No. 101114410.
Communication dated Jan. 18, 2017 issued by the Russia Federal Service on Intellectual Property in counterpart Russian Patent Application No. 2013151673.
Communication dated Feb. 28, 2017 issued by Japanese Patent Office in counterpart Japanese Application No. 2014-506340.

(56) References Cited

OTHER PUBLICATIONS

Communication dated Feb. 28, 2017 issued by Japanese Patent Office in counterpart Japanese Application No. 2014-506341.

* cited by examiner

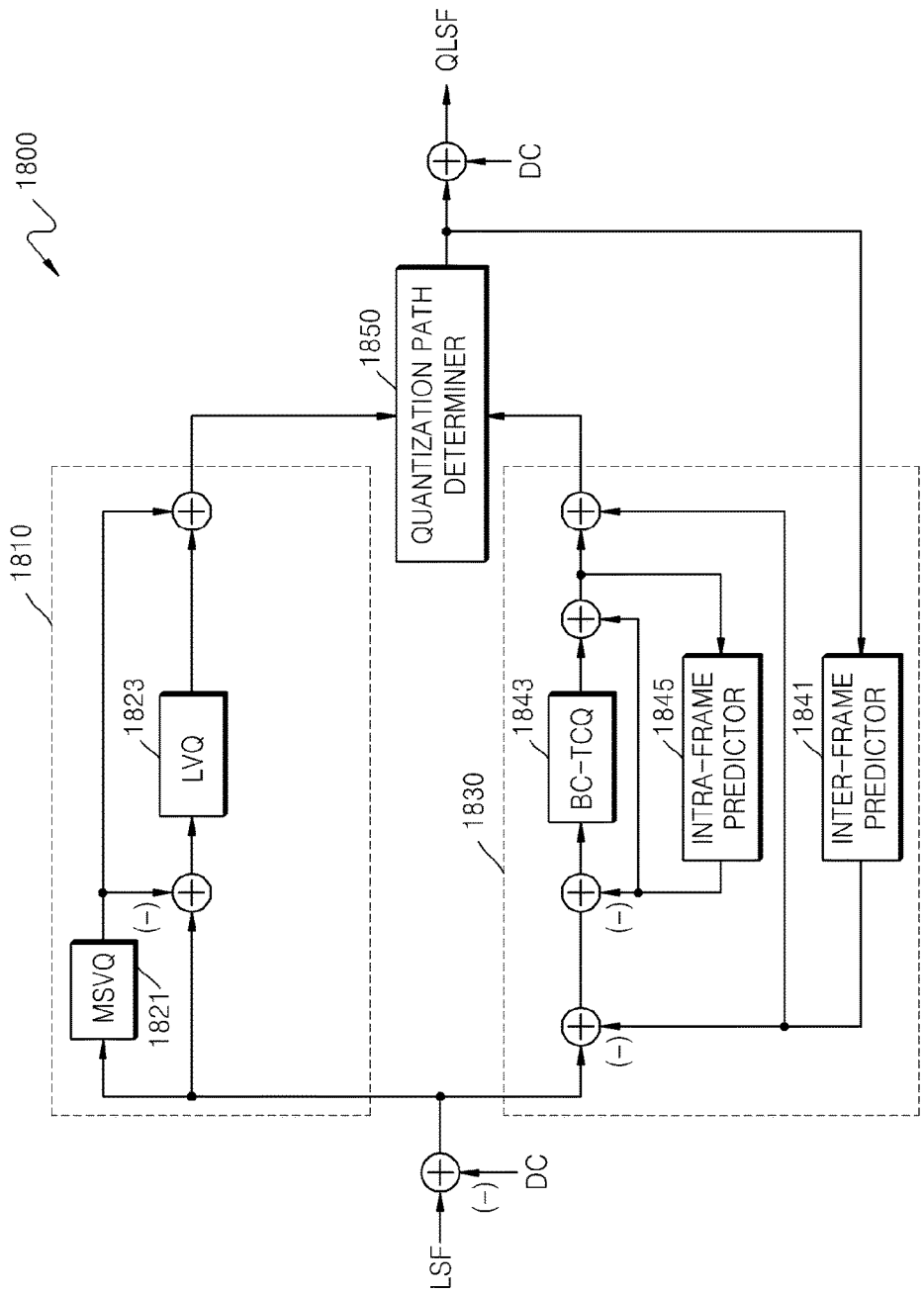

METHOD OF QUANTIZING LINEAR PREDICTIVE CODING COEFFICIENTS, SOUND ENCODING METHOD, METHOD OF DE-QUANTIZING LINEAR PREDICTIVE CODING COEFFICIENTS, SOUND DECODING METHOD, AND RECORDING MEDIUM AND ELECTRONIC DEVICE THEREFOR

CROSS-REFERENCE TO RELATED PATENT APPLICATION

This is a continuation application of U.S. application Ser. No. 13/453,386, filed Apr. 23, 2012, which claims the benefit of U.S. Provisional Application No. 61/477,797, filed on Apr. 21, 2011 and U.S. Provisional Application No. 61/481,874, filed on May 3, 2011 in the U.S. Patent Trademark Office, the disclosures of which are incorporated by reference herein in their entirety.

BACKGROUND

1. Field

Methods and devices consistent with the present disclosure relate to quantization and inverse quantization of linear predictive coding coefficients, and more particularly, to a method of efficiently quantizing linear predictive coding coefficients with low complexity, a sound encoding method employing the quantizing method, a method of inverse quantizing linear predictive coding coefficients, a sound decoding method employing the inverse quantizing method, and an electronic device and a recording medium therefor.

2. Description of the Related Art

In systems for encoding a sound, such as voice or audio, Linear Predictive Coding (LPC) coefficients are used to represent a short-time frequency characteristic of the sound. The LPC coefficients are obtained in a pattern of dividing an input sound in frame units and minimizing energy of a predictive error per frame. However, since the LPC coefficients have a large dynamic range and a characteristic of a used LPC filter is very sensitive to quantization errors of the LPC coefficients, the stability of the LPC filter is not guaranteed.

Thus, quantization is performed by converting LPC coefficients to other coefficients easy to check the stability of a filter, advantageous to interpolation, and having a good quantization characteristic. It is mainly preferred that the quantization is performed by converting LPC coefficients to Line Spectral Frequency (LSF) or Immittance Spectral Frequency (ISF) coefficients. In particular, a method of quantizing LPC coefficients may increase a quantization gain by using a high inter-frame correlation of LSF coefficients in a frequency domain and a time domain.

LSF coefficients indicate a frequency characteristic of a short-time sound, and for frames in which a frequency characteristic of an input sound is rapidly changed, LSF coefficients of the frames are also rapidly changed. However, for a quantizer using the high inter-frame correlation of LSF coefficients, since proper prediction cannot be performed for rapidly changed frames, quantization performance of the quantizer decreases.

SUMMARY

It is an aspect to provide a method of efficiently quantizing Linear Predictive Coding (LPC) coefficients with low complexity, a sound encoding method employing the quantizing method, a method of inverse quantizing LPC coefficients, a sound decoding method employing the inverse quantizing method, and an electronic device and a recoding medium therefor.

According to an aspect of one or more exemplary embodiments, there is provided a quantizing method comprising quantizing an input signal by selecting one of a first quantization scheme not using an inter-frame prediction and a second quantization scheme using the inter-frame prediction, in consideration of at least one of a prediction mode, a predictive error and a transmission channel state.

According to another aspect of one or more exemplary embodiments, there is provided an encoding method comprising determining a coding mode of an input signal; quantizing the input signal by selecting one of a first quantization scheme not using an inter-frame prediction and a second quantization scheme using the inter-frame prediction, according to path information determined in consideration of at least one of a prediction mode, a predictive error and a transmission channel state; encoding the quantized input signal in the coding mode; and generating a bitstream including one of a result quantized in the first quantization scheme and a result quantized in the second quantization scheme, the coding mode of the input signal, and path information related to the quantization of the input signal.

According to another aspect of one or more exemplary embodiments, there is provided an inverse quantizing method comprising inverse quantizing an input signal by selecting one of a first inverse quantization scheme not using an inter-frame prediction and a second inverse quantization scheme using the inter-frame prediction, based on path information included in a bitstream, the path information is determined in consideration of at least one of a prediction mode, a predictive error and a transmission channel state, in an encoding end.

According to another aspect of one or more exemplary embodiments, there is provided a decoding method comprising decoding Linear Predictive Coding (LPC) parameters and a coding mode included in a bitstream; inverse quantizing the decoded LPC parameters by using one of a first inverse quantization scheme not using inter-frame prediction and a second inverse quantization scheme using the inter-frame prediction based on path information included in the bitstream; and decoding the inverse-quantized LPC parameters in the decoded coding mode, wherein the path information is determined in consideration of at least one of a prediction mode, a predictive error and a transmission channel state in an encoding end.

According to another aspect of one or more exemplary embodiments, there is provided a method of determining a quantizer type, the method comprising comparing a bit rate of an input signal with a first reference value; comparing a bandwidth of the input signal with a second reference value; comparing an internal sampling frequency with a third reference value; and determining the quantizer type for the input signal as one of a open-loop type and a closed-loop type based on the results of one or more of the comparisons.

According to another aspect of one or more exemplary embodiments, there is provided an electronic device including a communication unit that receives at least one of a sound signal and an encoded bitstream, or that transmits at least one of an encoded sound signal and a restored sound; and an encoding module that quantizes the received sound signal by selecting one of a first quantization scheme not using an inter-frame prediction and a second quantization scheme using the inter-frame prediction, according to path information determined in consideration of at least one of a prediction mode, a predictive error and a transmission channel state and encode the quantized sound signal in a coding mode.

According to another aspect of one or more exemplary embodiments, there is provided an electronic device including a communication unit that receives at least one of a sound signal and an encoded bitstream, or that transmits at least one of an encoded sound signal and a restored sound; and a decoding module that decodes Linear Predictive Coding (LPC) parameters and a coding mode included in the bitstream, inverse quantizes the decoded LPC parameters by using one of a first inverse quantization scheme not using inter-frame prediction and a second inverse quantization scheme using the inter-frame prediction based on path information included in the bitstream, and decodes the inverse-quantized LPC parameters in the decoded coding mode, wherein the path information is determined in consideration of at least one of a prediction mode, a predictive error and a transmission channel state in an encoding end.

According to another aspect of one or more exemplary embodiments, there is provided an electronic device including a communication unit that receives at least one of a sound signal and an encoded bitstream, or that transmits at least one of an encoded sound signal and a restored sound; an encoding module that quantizes the received sound signal by selecting one of a first quantization scheme not using an inter-frame prediction and a second quantization scheme using the inter-frame prediction, according to path information determined in consideration of at least one of a prediction mode, a predictive error and a transmission channel state and that encodes the quantized sound signal in a coding mode; and a decoding module that decodes Linear Predictive Coding (LPC) parameters and a coding mode included in the bitstream, inverse quantizes the decoded LPC parameters by using one of a first inverse quantization scheme not using inter-frame prediction and a second inverse quantization scheme using the inter-frame prediction based on path information included in the bitstream, and decodes the inverse-quantized LPC parameters in the decoded coding mode.

BRIEF DESCRIPTION OF THE DRAWINGS

The above and other aspects will become more apparent by describing in detail exemplary embodiments thereof with reference to the attached drawings in which:

FIG. 18 is a block diagram of an LPC coefficient quantizer according to another exemplary embodiment;

DETAILED DESCRIPTION

Figure 1:
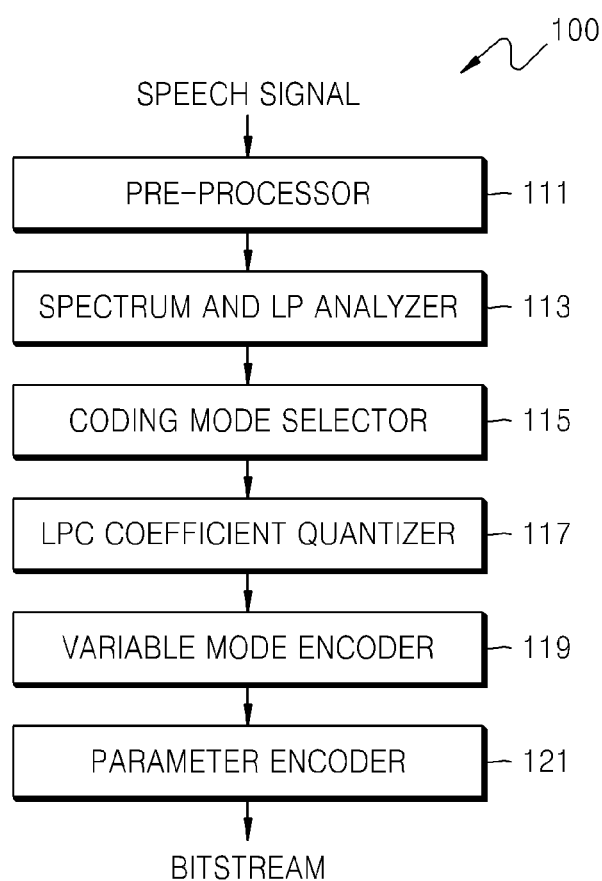
FIG. 1 is a block diagram of a sound encoding apparatus according to an exemplary embodiment.

The present inventive concept may allow various kinds of change or modification and various changes in form, and specific exemplary embodiments will be illustrated in drawings and described in detail in the specification. However, it should be understood that the specific exemplary embodiments do not limit the present inventive concept to a specific disclosing form but include every modified, equivalent, or replaced one within the spirit and technical scope of the present inventive concept. In the following description, well-known functions or constructions are not described in detail since they would obscure the invention with unnecessary detail.

Although terms, such as 'first' and 'second', can be used to describe various elements, the elements cannot be limited by the terms. The terms can be used to distinguish a certain element from another element.

The terminology used in the application is used only to describe specific exemplary embodiments and does not have any intention to limit the inventive concept. Although general terms as currently widely used as possible are selected as the terms used in the present inventive concept while taking functions in the present inventive concept into account, they may vary according to an intention of those of ordinary skill in the art, judicial precedents, or the appearance of new technology. In addition, in specific cases, terms intentionally selected by the applicant may be used, and in this case, the meaning of the terms will be disclosed in corresponding description. Accordingly, the terms used in the present inventive concept should be defined not by simple names of the terms but by the meaning of the terms and the content over the present inventive concept.

An expression in the singular includes an expression in the plural unless they are clearly different from each other in context. In the application, it should be understood that terms, such as 'include' and 'have', are used to indicate the existence of implemented feature, number, step, operation, element, part, or a combination of them without excluding in advance the possibility of existence or addition of one or more other features, numbers, steps, operations, elements, parts, or combinations of them.

The present inventive concept will now be described more fully with reference to the accompanying drawings, in which exemplary embodiments of the present invention are shown. Like reference numerals in the drawings denote like elements, and thus their repetitive description will be omitted.

Expressions such as "at least one of," when preceding a list of elements, modify the entire list of elements and do not modify the individual elements of the list.

FIG. 1 is a block diagram of a sound encoding apparatus 100 according to an exemplary embodiment.

The sound encoding apparatus 100 shown in FIG. 1 may include a pre-processor (e.g., a central processing unit (CPU)) 111, a spectrum and Linear Prediction (LP) analyzer 113, a coding mode selector 115, a Linear Predictive Coding (LPC) coefficient quantizer 117, a variable mode encoder 119, and a parameter encoder 121. Each of the components of the sound encoding apparatus 100 may be implemented by at least one processor (e.g., a central processing unit (CPU)) by being integrated in at least one module. It should be noted that a sound may indicate audio, speech, or a combination thereof. The description that follows will refer to sound as speech for convenience of description. However, it will be understood that any sound may be processed.

Referring to FIG. 1, the pre-processor 111 may pre-process an input speech signal. In the pre-processing process, an undesired frequency component may be removed from the speech signal, or a frequency characteristic of the speech signal may be adjusted to be advantageous for encoding. In detail, the pre-processor 111 may perform high pass filtering, pre-emphasis, or sampling conversion.

The spectrum and LP analyzer 113 may extract LPC coefficients by analyzing characteristics in a frequency domain or performing LP analysis on the pre-processed speech signal. Although one LP analysis per frame is generally performed, two or more LP analyses per frame may be performed for additional sound quality improvement. In this case, one LP analysis is an LP for a frame end, which is performed as a conventional LP analysis, and the others may be LP for mid-subframes for sound quality improvement. In this case, a frame end of a current frame indicates a final subframe among subframes forming the current frame, and a frame end of a previous frame indicates a final subframe among subframes forming the previous frame. For example, one frame may consist of 4 subframes.

The mid-subframes indicate one or more subframes among subframes existing between the final subframe, which is the frame end of the previous frame, and the final subframe, which is the frame end of the current frame. Accordingly, the spectrum and LP analyzer 113 may extract a total of two or more sets of LPC coefficients. The LPC coefficients may use an order of 10 when an input signal is a narrowband and may use an order of 16 to 20 when the input signal is a wideband. However, the dimension of the LPC coefficients is not limited thereto.

The coding mode selector 115 may select one of a plurality of coding modes in correspondence with multi-rates. In addition, the coding mode selector 115 may select one of the plurality of coding modes by using characteristics of the speech signal, which is obtained from band information, pitch information, or analysis information of the frequency domain. In addition, the coding mode selector 115 may select one of the plurality of coding modes by using the multi-rates and the characteristics of the speech signal.

The LPC coefficient quantizer 117 may quantize the LPC coefficients extracted by the spectrum and LP analyzer 113. The LPC coefficient quantizer 117 may perform the quantization by converting the LPC coefficients to other coefficients suitable for quantization. The LPC coefficient quantizer 117 may select one of a plurality of paths including a first path not using inter-frame prediction and a second path using the inter-frame prediction as a quantization path of the speech signal based on a first criterion before quantization of the speech signal and quantize the speech signal by using one of a first quantization scheme and a second quantization scheme according to the selected quantization path. Alternatively, the LPC coefficient quantizer 117 may quantize the LPC coefficients for both the first path by the first quantization scheme not using the inter-frame prediction and the second path by the second quantization scheme using the inter-frame prediction and select a quantization result of one of the first path and the second path based on a second criterion. The first and second criteria may be identical with each other or different from each other.

The variable mode encoder 119 may generate a bitstream by encoding the LPC coefficients quantized by the LPC coefficient quantizer 117. The variable mode encoder 119 may encode the quantized LPC coefficients in the coding mode selected by the coding mode selector 115. The variable mode encoder 119 may encode an excitation signal of the LPC coefficients in units of frames or subframes.

An example of coding algorithms used in the variable mode encoder 119 may be Code-Excited Linear Prediction (CELP) or Algebraic CELP (ACELP). A transform coding algorithm may be additionally used according to a coding mode. Representative parameters for encoding the LPC coefficients in the CELP algorithm are an adaptive codebook index, an adaptive codebook gain, a fixed codebook index, and a fixed codebook gain. The current frame encoded by the variable mode encoder 119 may be stored for encoding a subsequent frame.

The parameter encoder 121 may encode parameters to be used by a decoding end for decoding to be included in a bitstream. It is advantageous if parameters corresponding to the coding mode are encoded. The bitstream generated by the parameter encoder 121 may be stored or transmitted.

Figure 2A:
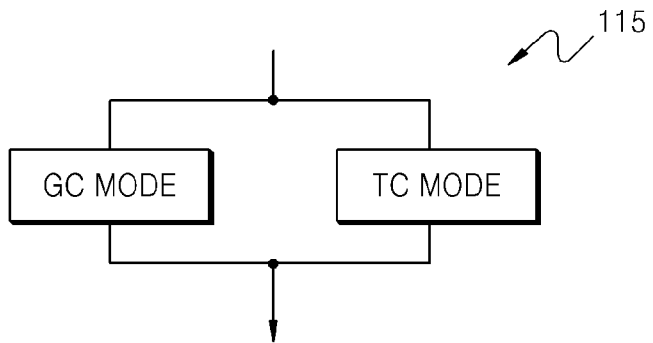
FIGS. 2A to 2D are examples of various encoding modes selectable by an encoding mode selector of the sound encoding apparatus of FIG. 1.
Figure 2B:
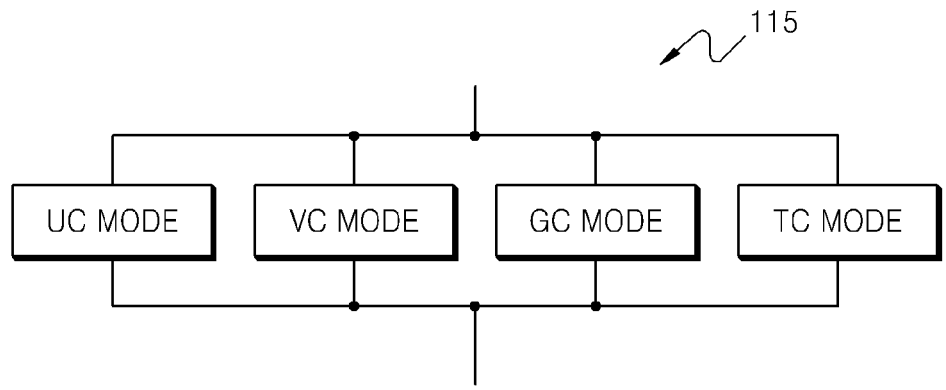
Figure 2C:
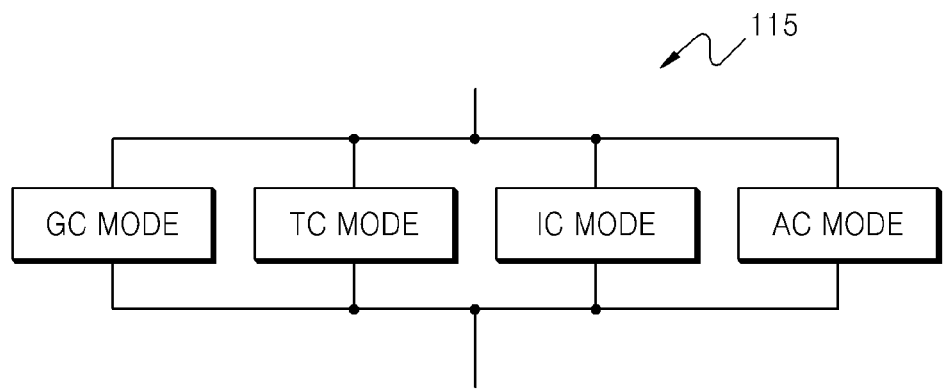
Figure 2D:
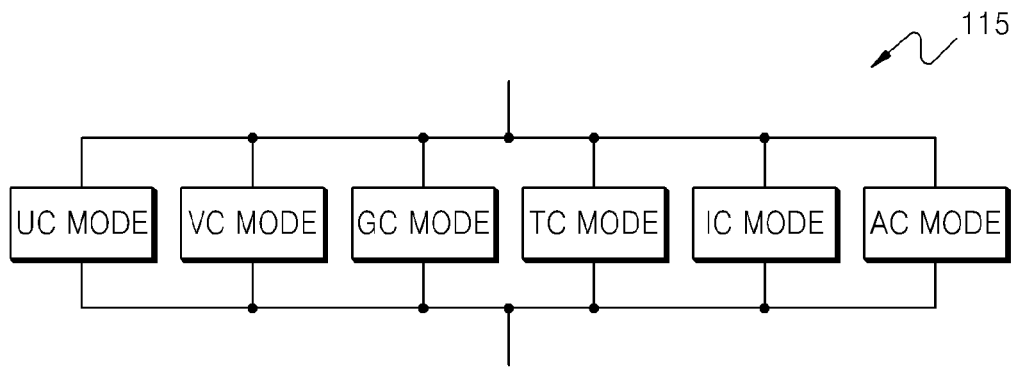

FIGS. 2A to 2D are examples of various coding modes selectable by the coding mode selector 115 of the sound encoding apparatus 100 of FIG. 1. FIGS. 2A and 2C are examples of coding modes classified in a case where the number of bits allocated to quantization is great, i.e., a case of a high bit rate, and FIGS. 2B and 2D are examples of coding modes classified in a case where the number of bits allocated to quantization is small, i.e., a case of a low bit rate.

First, in the case of a high bit rate, the speech signal may be classified into a Generic Coding (GC) mode and a Transition Coding (TC) mode for a simple structure, as shown in FIG. 2A. In this case, the GC mode includes an Unvoiced Coding (UC) mode and a Voiced Coding (VC) mode. In the case of a high bit rate, an Inactive Coding (IC) mode and an Audio Coding (AC) mode may be further included, as shown in FIG. 2C.

In addition, in the case of a low bit rate, the speech signal may be classified into the GC mode, the UC mode, the VC mode, and the TC mode, as shown in FIG. 2B. In addition, in the case of a low bit rate, the IC mode and the AC mode may be further included, as shown in FIG. 2D.

In FIGS. 2A and 2C, the UC mode may be selected when the speech signal is an unvoiced sound or noise having similar characteristics to the unvoiced sound. The VC mode may be selected when the speech signal is a voiced sound. The TC mode may be used to encode a signal of a transition interval in which characteristics of the speech signal are rapidly changed. The GC mode may be used to encode other signals. The UC mode, the VC mode, the TC mode, and the GC mode are based on a definition and classification criterion disclosed in ITU-T G.718 but are not limited thereto.

In FIGS. 2B and 2D, the IC mode may be selected for a silent sound, and the AC mode may be selected when characteristics of the speech signal are approximate to audio.

The coding modes may be further classified according to bands of the speech signal. The bands of the speech signal may be classified into, for example, a Narrow Band (NB), a Wide Band (WB), a Super Wide Band (SWB), and a Full Band (FB). The NB may have a bandwidth of about 300 Hz to about 3400 Hz or about 50 Hz to about 4000 Hz, the WB may have a bandwidth of about 50 Hz to about 7000 Hz or about 50 Hz to about 8000 Hz, the SWB may have a bandwidth of about 50 Hz to about 14000 Hz or about 50 Hz to about 16000 Hz, and the FB may have a bandwidth of up to about 20000 Hz. Here, the numerical values related to bandwidths are set for convenience and are not limited thereto. In addition, the classification of the bands may be set more simply or with more complexity than the above description.

The variable mode encoder 119 of FIG. 1 may encode the LPC coefficients by using different coding algorithms corresponding to the coding modes shown in FIGS. 2A to 2D. When the types of coding modes and the number of coding modes are determined, a codebook may need to be trained again by using speech signals corresponding to the determined coding modes.

Table 1 shows an example of quantization schemes and structures in a case of 4 coding modes. Here, a quantizing method not using the inter-frame prediction may be named a safety-net scheme, and a quantizing method using the inter-frame prediction may be named a predictive scheme. In addition, VQ denotes a vector quantizer, and BC-TCQ denotes a block-constrained trellis-coded quantizer.

TABLE 1

| Coding Mode | Quantization Scheme | Structure |
| --- | --- | --- |
| UC, NB/WB | Satety-net | VQ + BC-TCQ |
| VC, NB/WB | Satety-net | VQ + BC-TCQ |
| | Predictive | Inter-frame prediction + BC-TCQ with intra-frame prediction |
| GC, NB/WB | Satety-net | VQ + BC-TCQ |
| | Predictive | Inter-frame prediction + BC-TCQ with intra-frame prediction |
| TC, NB/WB | Satety-net | VQ + BC-TCQ |

The coding modes may be changed according to an applied bit rate. As described above, to quantize the LPC coefficients at a high bit rate using two coding modes, 40 or 41 bits per frame may be used in the GC mode, and 46 bits per frame may be used in the TC mode.

Figure 3:
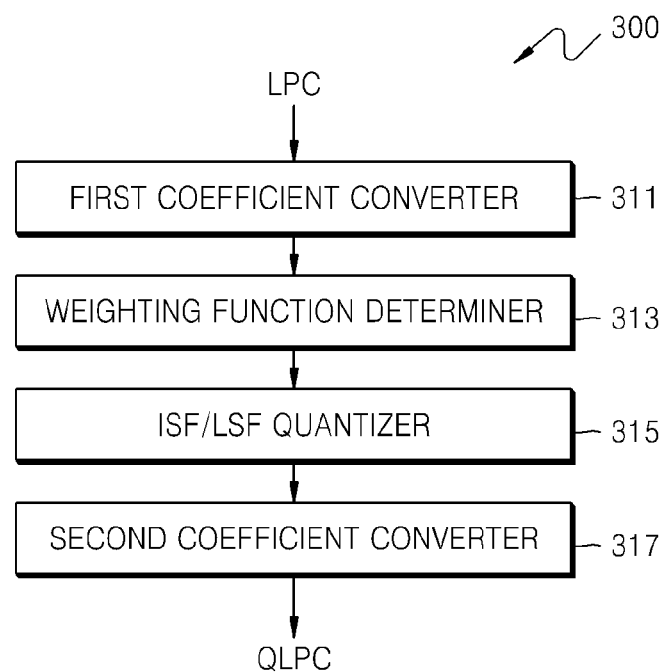
FIG. 3 is a block diagram of a Linear Predictive Coding (LPC) coefficient quantizer according to an exemplary embodiment.

FIG. 3 is a block diagram of an LPC coefficient quantizer 300 according to an exemplary embodiment.

The LPC coefficient quantizer 300 shown in FIG. 3 may include a first coefficient converter 311, a weighting function determiner 313, an Immittance Spectral Frequency (ISF)/Line Spectral Frequency (LSF) quantizer 315, and a second coefficient converter 317. Each of the components of the LPC coefficient quantizer 300 may be implemented by at least one processor (e.g., a central processing unit (CPU)) by being integrated in at least one module.

Referring to FIG. 3, the first coefficient converter 311 may convert LPC coefficients extracted by performing LP analysis on a frame end of a current or previous frame of a speech signal to coefficients in another format. For example, the first coefficient converter 311 may convert the LPC coefficients of the frame end of a current or previous frame to any one format of LSF coefficients and ISF coefficients. In this case, the ISF coefficients or the LSF coefficients indicate an example of formats in which the LPC coefficients can be easily quantized.

The weighting function determiner 313 may determine a weighting function related to the importance of the LPC coefficients with respect to the frame end of the current frame and the frame end of the previous frame by using the ISF coefficients or the LSF coefficients converted from the LPC coefficients. The determined weighting function may be used in a process of selecting a quantization path or searching for a codebook index by which weighting errors are minimized in quantization. For example, the weighting function determiner 313 may determine a weighting function per magnitude and a weighting function per frequency.

In addition, the weighting function determiner 313 may determine a weighting function by considering at least one of a frequency band, a coding mode, and spectrum analysis information. For example, the weighting function determiner 313 may derive an optimal weighting function per coding mode. In addition, the weighting function determiner 313 may derive an optimal weighting function per frequency band. Further, the weighting function determiner 313 may derive an optimal weighting function based on frequency analysis information of the speech signal. The frequency analysis information may include spectrum tilt information. The weighting function determiner 313 will be described in more detail below.

The ISF/LSF quantizer 315 may quantize the ISF coefficients or the LSF coefficients converted from the LPC coefficients of the frame end of the current frame. The ISF/LSF quantizer 315 may obtain an optimal quantization index in an input coding mode. The ISF/LSF quantizer 315 may quantize the ISF coefficients or the LSF coefficients by using the weighting function determined by the weighting function determiner 313. The ISF/LSF quantizer 315 may quantize the ISF coefficients or the LSF coefficients by selecting one of a plurality of quantization paths in the use of the weighting function determined by the weighting function determiner 313. As a result of the quantization, a quantization index of the ISF coefficients or the LSF coefficients and Quantized ISF (QISF) or Quantized LSF (QLSF) coefficients with respect to the frame end of the current frame may be obtained.

The second coefficient converter 317 may convert the QISF or QLSF coefficients to Quantized LPC (QLPC) coefficients.

A relationship between vector quantization of LPC coefficients and a weighting function will now be described.

The vector quantization indicates a process of selecting a codebook index having the least error by using a squared error distance measure, considering that all entries in a vector have the same importance. However, since importance is different in each of the LPC coefficients, if errors of important coefficients are reduced, a perceptual quality of a final synthesized signal may increase. Thus, when LSF coefficients are quantized, decoding apparatuses may increase a performance of a synthesized signal by applying a weighting function representing importance of each of the LSF coefficients to the squared error distance measure and selecting an optimal codebook index.

According to an exemplary embodiment, a weighting function per magnitude may be determined based on that each of the ISF or LSF coefficients actually affects a spectral envelope by using frequency information and actual spectral magnitudes of the ISF or LSF coefficients. According to an exemplary embodiment, additional quantization efficiency may be obtained by combining the weighting function per magnitude and a weighting function per frequency considering perceptual characteristics and a formant distribution of the frequency domain. According to an exemplary embodiment, since an actual magnitude of the frequency domain is used, envelope information of all frequencies may be reflected well, and a weight of each of the ISF or LSF coefficients may be correctly derived.

According to an exemplary embodiment, when vector quantization of ISF or LSF coefficients converted from LPC coefficients is performed, if the importance of each coefficient is different, a weighting function indicating which entry is relatively more important in a vector may be determined. In addition, a weighting function capable of weighting a high energy portion more by analyzing a spectrum of a frame to be encoded may be determined to improve an accuracy of encoding. High spectral energy indicates a high correlation in the time domain.

An example of applying such a weighting function to an error function is described.

First, if variation of an input signal is high, when quantization is performed without using the inter-frame prediction, an error function for searching for a codebook index through QISF coefficients may be represented by Equation 1 below. Otherwise, if the variation of the input signal is low, when quantization is performed using the inter-frame prediction, an error function for searching for a codebook index through the QISF coefficients may be represented by Equation 2. A codebook index indicates a value for minimizing a corresponding error function.

$$E_{werr}(k) = \sum_{i=0}^{p} w(i)[z(i) - c_z^k(i)]^2 \quad (1)$$

$$E_{werr}(p) = \sum_{i=0}^{p} w(i)[r(i) - c_r^p(i)]^2 \quad (2)$$

Here, w(i) denotes a weighting function, z(i) and r(i) denote inputs of a quantizer, z(i) denotes a vector in which a mean value is removed from ISF(i) in FIG. 3, and r(i) denotes a vector in which an inter-frame predictive value is removed from z(i). $E_{werr}(k)$ may be used to search a codebook in case that an inter-frame prediction is not performed and $E_{werr}(p)$ may be used to search a codebook in case that an inter-frame prediction is performed. In addition, c(i) denotes a codebook, and p denotes an order of ISF coefficients, which is usually 10 in the NB and 16 to 20 in the WB.

According to an exemplary embodiment, encoding apparatuses may determine an optimal weighting function by combining a weighting function per magnitude in the use of spectral magnitudes corresponding to frequencies of ISF or LSF coefficients converted from LPC coefficients and a weighting function per frequency in consideration of perceptual characteristics and a formant distribution of an input signal.

Figure 4:
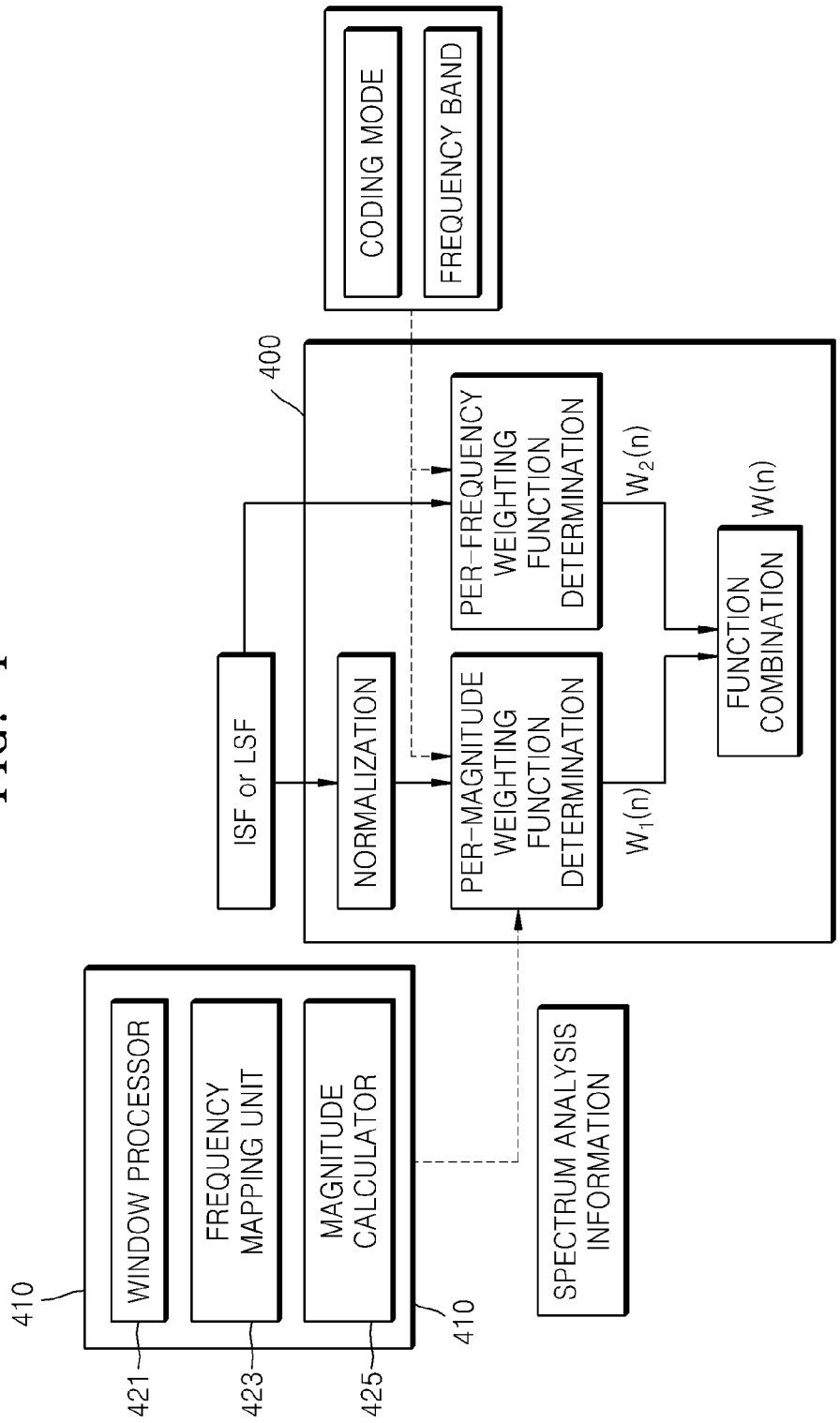
FIG. 4 is a block diagram of a weighting function determiner according to an exemplary embodiment.

FIG. 4 is a block diagram of a weighting function determiner 400 according to an exemplary embodiment. The weighting function determiner 400 is shown together with a window processor 421, a frequency mapping unit 423, and a magnitude calculator 425 of a spectrum and LP analyzer 410.

Referring to FIG. 4, the window processor 421 may apply a window to an input signal. The window may be a rectangular window, a Hamming window, or a sine window.

The frequency mapping unit 423 may map the input signal in the time domain to an input signal in the frequency domain. For example, the frequency mapping unit 423 may transform the input signal to the frequency domain through a Fast Fourier Transform (FFT) or a Modified Discrete Cosine Transform (MDCT).

The magnitude calculator 425 may calculate magnitudes of frequency spectrum bins with respect to the input signal transformed to the frequency domain. The number of frequency spectrum bins may be the same as a number for normalizing ISF or LSF coefficients by the weighting function determiner 400.

Spectrum analysis information may be input to the weighting function determiner 400 as a result performed by the spectrum and LP analyzer 410. In this case, the spectrum analysis information may include a spectrum tilt.

The weighting function determiner 400 may normalize ISF or LSF coefficients converted from LPC coefficients. A range to which the normalization is actually applied from among $p^{th}$-order ISF coefficients is $0^{th}$ to $(p-2)^{th}$ orders. Usually, $0^{th}$ to $(p-2)^{th}$ order ISF coefficients exist between 0 and $\pi$. The weighting function determiner 400 may perform the normalization with the same number K as the number of frequency spectrum bins, which is derived by the frequency mapping unit 423 to use the spectrum analysis information.

The weighting function determiner 400 may determine a per-magnitude weighting function $W_1(n)$ in which the ISF or LSF coefficients affect a spectral envelope for a mid-sub-frame by using the spectrum analysis information. For example, the weighting function determiner 400 may determine the per-magnitude weighting function $W_1(n)$ by using frequency information of the ISF or LSF coefficients and actual spectral magnitudes of the input signal. The per-magnitude weighting function $W_1(n)$ may be determined for the ISF or LSF coefficients converted from the LPC coefficients.

The weighting function determiner 400 may determine the per-magnitude weighting function $W_1(n)$ by using a magnitude of a frequency spectrum bin corresponding to each of the ISF or LSF coefficients.

The weighting function determiner 400 may determine the per-magnitude weighting function $W_1(n)$ by using magnitudes of a spectrum bin corresponding to each of the ISF or LSF coefficients and at least one adjacent spectrum bin located around the spectrum bin. In this case, the weighting function determiner 400 may determine the per-magnitude weighting function $W_1(n)$ related to a spectral envelope by extracting a representative value of each spectrum bin and at least one adjacent spectrum bin. An example of the representative value is a maximum value, a mean value, or an intermediate value of a spectrum bin corresponding to each of the ISF or LSF coefficients and at least one adjacent spectrum bin.

The weighting function determiner 400 may determine a per-frequency weighting function $W_2(n)$ by using the frequency information of the ISF or LSF coefficients. In detail, the weighting function determiner 400 may determine the per-frequency weighting function $W_2(n)$ by using perceptual characteristics and a formant distribution of the input signal. In this case, the weighting function determiner 400 may extract the perceptual characteristics of the input signal according to a bark scale. Then, the weighting function determiner 400 may determine the per-frequency weighting function $W_2(n)$ based on a first formant of the formant distribution.

The per-frequency weighting function $W_2(n)$ may result in a relatively low weight in a super low frequency and a high frequency and result in a constant weight in a frequency interval of a low frequency, e.g., an interval corresponding to the first formant.

The weighting function determiner 400 may determine a final weighting function W(n) by combining the per-magnitude weighting function $W_1(n)$ and the per-frequency weighting function $W_2(n)$. In this case, the weighting function determiner 400 may determine the final weighting function W(n) by multiplying or adding the per-magnitude weighting function $W_1(n)$ by or to the per-frequency weighting function $W_2(n)$.

As another example, the weighting function determiner 400 may determine the per-magnitude weighting function $W_1(n)$ and the per-frequency weighting function $W_2(n)$ by considering a coding mode and frequency band information of the input signal.

To do this, the weighting function determiner 400 may check coding modes of the input signal for a case where a bandwidth of the input signal is a NB and a case where the bandwidth of the input signal is a WB by checking the bandwidth of the input signal. When the coding mode of the input signal is the UC mode, the weighting function determiner 400 may determine and combine the per-magnitude weighting function $W_1(n)$ and the per-frequency weighting function $W_2(n)$ in the UC mode.

When the coding mode of the input signal is not the UC mode, the weighting function determiner 400 may determine and combine the per-magnitude weighting function $W_1(n)$ and the per-frequency weighting function $W_2(n)$ in the VC mode.

If the coding mode of the input signal is the GC mode or the TC mode, the weighting function determiner 400 may determine a weighting function through the same process as in the VC mode.

For example, when the input signal is frequency-transformed by the FFT algorithm, the per-magnitude weighting function $W_1(n)$ using spectral magnitudes of FFT coefficients may be determined by Equation 3 below.

$W_1(n) = (3 \cdot \sqrt{w_f(n) - \mathrm{Min}}) + 2$, Min=Minimum value of $w_f(n)$ Where, $w_f(n) = 10(\log(\max(E_{bin}(\mathrm{norm}=isf(n)), E_{bin}(\mathrm{norm}=isf(n)+1), E_f(\mathrm{norm}=isf(n)-1)))$, for, n=0, ..., M−2, 1≤norm=isf(n)≤126

$w_f(n) = 10 \log(E\mathrm{bin}(\mathrm{norm}=isf(n)))$, for, norm=isf(n)=0 or 127 norm_$isf(n)=isf(n)/50$, then, 0≤$isf(n)$≤6350, and 0≤norm_$isf(n)$≤127

$$E_{bin}(k) = X_R^2(k) + X_I^2(k), k=0, \ldots, 127 \quad (3)$$

For example, the per-frequency weighting function $W_2(n)$ in the VC mode may be determined by Equation 4, and the per-frequency weighting function $W_2(n)$ in the UC mode may be determined by Equation 5. Constants in Equations 4 and 5 may be changed according to characteristics of the input signal:

$$W_2(n) = 0.5 + \frac{\sin\left(\frac{\pi \cdot \mathrm{norm\_isf}(n)}{12}\right)}{2}, \text{For, norm\_isf}(n) = [0,5] \quad (4)$$

$W_2(n) = 1.0$, For, norm_isf$(n) = [6, 20]$ $$W_2(n) = \frac{1}{\left(\frac{4 * (\mathrm{norm\_isf}(n) - 20)}{107} + 1\right)},$$

For, norm_isf$(n) = [21, 127]$ $$W_2(n) = 0.5 + \frac{\sin\left(\frac{\pi \cdot \mathrm{norm\_isf}(n)}{12}\right)}{2}, \text{For, norm\_isf}(n) = [0,5] \quad (5)$$

$$W_2(n) = \frac{1}{\left(\frac{(\mathrm{norm\_isf}(n) - 6)}{121} + 1\right)},$$

For, norm_isf$(n) = [6, 127]$

The finally derived weighting function W(n) may be determined by Equation 6.

$W(n) = W_1(n) \cdot W_2(n)$, for $n=0, \ldots, M-2$ $$W(M-1) = 1.0 \quad (6)$$

Figure 5:
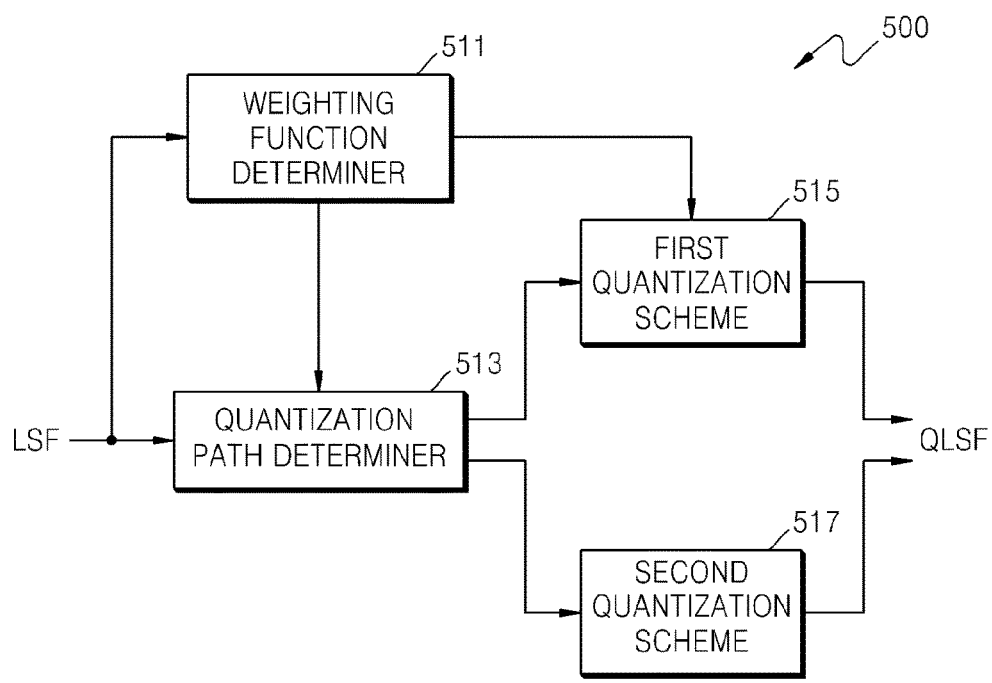
FIG. 5 is a block diagram of an LPC coefficient quantizer according to another exemplary embodiment.

FIG. 5 is a block diagram of an LPC coefficient quantizer according to an exemplary embodiment.

Referring to FIG. 5, the LPC coefficient quantizer 500 may include a weighting function determiner 511, a quantization path determiner 513, a first quantization scheme 515, and a second quantization scheme 517. Since the weighting function determiner 511 has been described in FIG. 4, a description thereof is omitted herein.

The quantization path determiner 513 may determine that one of a plurality of paths, including a first path not using inter-frame prediction and a second path using the inter-frame prediction, is selected as a quantization path of an input signal, based on a criterion before quantization of the input signal.

The first quantization scheme 515 may quantize the input signal provided from the quantization path determiner 513, when the first path is selected as the quantization path of the input signal. The first quantization scheme 515 may include a first quantizer (not shown) for roughly quantizing the input signal and a second quantizer (not shown) for precisely quantizing a quantization error signal between the input signal and an output signal of the first quantizer.

The second quantization scheme 517 may quantize the input signal provided from the quantization path determiner 513, when the second path is selected as the quantization path of the input signal. The first quantization scheme 515 may include an element for performing block-constrained trellis-coded quantization on a predictive error of the input signal and an inter-frame predictive value and an inter-frame prediction element.

The first quantization scheme 515 is a quantization scheme not using the inter-frame prediction and may be named the safety-net scheme. The second quantization scheme 517 is a quantization scheme using the inter-frame prediction and may be named the predictive scheme.

The first quantization scheme 515 and the second quantization scheme 517 are not limited to the current exemplary embodiment and may be implemented by using first and second quantization schemes according to various exemplary embodiments described below, respectively.

Accordingly, in correspondence with a low bit rate for a high-efficient interactive voice service to a high bit rate for providing a differentiated-quality service, an optimal quantizer may be selected.

Figure 6:
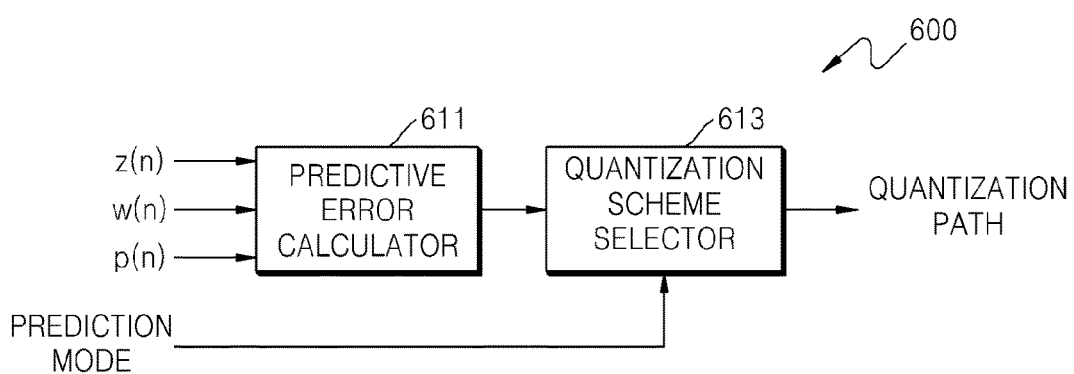
FIG. 6 is a block diagram of a quantization path selector according to an exemplary embodiment.

FIG. 6 is a block diagram of a quantization path determiner according to an exemplary embodiment. Referring to FIG. 6, the quantization path determiner 600 may include a predictive error calculator 611 and a quantization scheme selector 613.

The predictive error calculator 611 may calculate a predictive error in various methods by receiving an inter-frame predictive value p(n), a weighting function w(n), and an LSF coefficient z(n) from which a Direct Current (DC) value is removed. First, an inter-frame predictor (not shown) that is the same as used in a second quantization scheme, i.e., the predictive scheme, may be used. Here, any one of an Auto-Regressive (AR) method and a Moving Average (MA) method may be used. A signal z(n) of a previous frame for inter-frame prediction may use a quantized value or a non-quantized value. In addition, a predictive error may be obtained by using or not using the weighting function w(n). Accordingly, the total number of combinations is 8, 4 of which are as follows:

First, a weighted AR predictive error using a quantized signal $\hat{z}(n)$ of a previous frame may be represented by Equation 7.

$$E_p = \sum_{i=0}^{M-1} W_{end}(i)\left(Z_k(i) - \hat{Z}_{k-1}(i)\rho(i)\right)^2 \quad (7)$$

Second, an AR predictive error using the quantized signal $\hat{z}(n)$ of the previous frame may be represented by Equation 8.

$$E_p = \sum_{i=0}^{M-1} \left(Z_k(i) - \hat{Z}_{k-1}(i)\rho(i)\right)^2 \quad (8)$$

Third, a weighted AR predictive error using the signal z(n) of the previous frame may be represented by Equation 9.

$$E_p = \sum_{i=0}^{M-1} W_{end}(i)(Z_k(i) - Z_{k-1}(i)\rho(i))^2 \quad (9)$$

Fourth, an AR predictive error using the signal z(n) of the previous frame may be represented by Equation 10.

$$E_p = \sum_{i=0}^{M-1} (Z_k(i) - Z_{k-1}(i)\rho(i))^2 \quad (10)$$

In Equations 7 to 10, M denotes an order of LSF coefficients and M is usually 16 when a bandwidth of an input speech signal is a WB, and ρ(i) denotes a predictive coefficient of the AR method. As described above, information regarding an immediately previous frame is generally used, and a quantization scheme may be determined by using a predictive error obtained from the above description.

In addition, for a case where information regarding a previous frame does not exist due to frame errors in the previous frame, a second predictive error may be obtained by using a frame immediately before the previous frame, and a quantization scheme may be determined by using the second predictive error. In this case, the second predictive error may be represented by Equation 11 below compared with Equation 7.

$$E_{p2} = \sum_{i=0}^{M-1} W_{end}(i)\left(Z_k(i) - \hat{Z}_{k-2}(i)\rho(i)\right)^2 \quad (11)$$

The quantization scheme selector 613 determines a quantization scheme of a current frame by using at least one of the predictive error obtained by the predictive error calculator 611 and the coding mode obtained by the coding mode determiner (115 of FIG. 1).

Figure 7A:
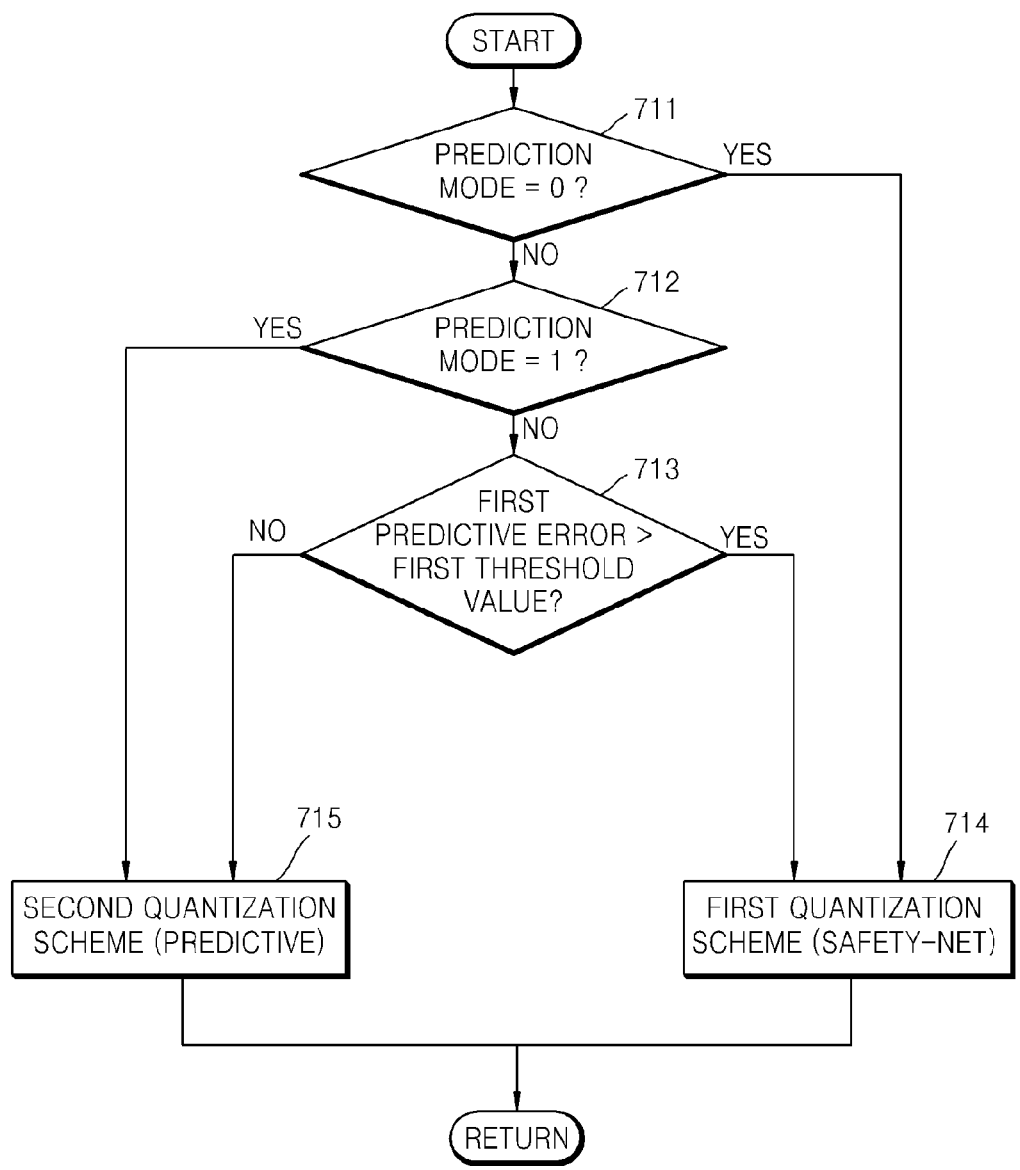
FIGS. 7A and 7B are flowcharts illustrating operations of the quantization path selector of FIG. 6, according to an exemplary embodiment.

FIG. 7A is a flowchart illustrating an operation of the quantization path determiner of FIG. 6, according to an exemplary embodiment. As an example, 0, 1 and 2 may be used as a prediction mode. In a prediction mode 0, only a safety-net scheme may be used and in a prediction mode 1, only a predictive scheme may be used. In a prediction mode 2, the safety-net scheme and the predictive scheme may be switched.

A signal to be encoded at the prediction mode 0 has a non-stationary characteristic. A non-stationary signal has a great variation between neighboring frames. Therefore, if an inter-frame prediction is performed on the non-stationary signal, a prediction error may be larger than an original signal, which results in deterioration in the performance of a quantizer. A signal to be encoded at the prediction mode 1 has a stationary characteristic. Because a stationary signal has a small variation between neighboring frames, an inter-frame correlation thereof is high. The optimal performance may be obtained by performing at a prediction mode 2 quantization of a signal in which a non-stationary characteristic and a stationary characteristic are mixed. Even though a signal has both a non-stationary characteristic and a stationary characteristic, either a prediction mode 0 or a prediction mode 1 may be set, based on a ratio of mixing. Meanwhile, the ratio of mixing to be set at a prediction mode 2 may be defined in advance as an optimal value experimentally or through simulations.

Referring to FIG. 7A, in operation 711, it is determined whether a prediction mode of a current frame is 0, i.e., whether a speech signal of the current frame has a non-stationary characteristic. As a result of the determination in operation 711, if the prediction mode is 0, e.g., when variation of the speech signal of the current frame is great as in the TC mode or the UC mode, since inter-frame prediction is difficult, the safety-net scheme, i.e., the first quantization scheme, may be determined as a quantization path in operation 714.

As a result of the determination in operation 711, if the prediction mode is not 0, it is determined in operation 712 whether the prediction mode is 1, i.e., whether a speech signal of the current frame has a stationary characteristic. As a result of the determination in operation 712, if the prediction mode is 1, since inter-frame prediction performance is excellent, the predictive scheme, i.e., the second quantization scheme, may be determined as the quantization path in operation 715.

As a result of the determination in operation 712, if the prediction mode is not 1, it is determined that the prediction mode is 2 to use the first quantization scheme and the second quantization scheme in a switching manner. For example, when the speech signal of the current frame does not have the non-stationary characteristic, i.e., when the prediction mode is 2 in the GC mode or the VC mode, one of the first quantization scheme and the second quantization scheme may be determined as the quantization path by taking a predictive error into account. To do this, it is determined in operation 713 whether a first predictive error between the current frame and a previous frame is greater than a first threshold. The first threshold may be defined in advance as an optimal value experimentally or through simulations. For example, in a case of a WB having an order of 16, the first threshold may be set to 2,085,975.

As a result of the determination in operation 713, if the first predictive error is greater than or equal to the first threshold, the first quantization scheme may be determined as the quantization path in operation 714. As a result of the determination in operation 713, if the first predictive error is not greater than the first threshold, the predictive scheme, i.e., the second quantization scheme may be determined as the quantization path in operation 715.

Figure 7B:
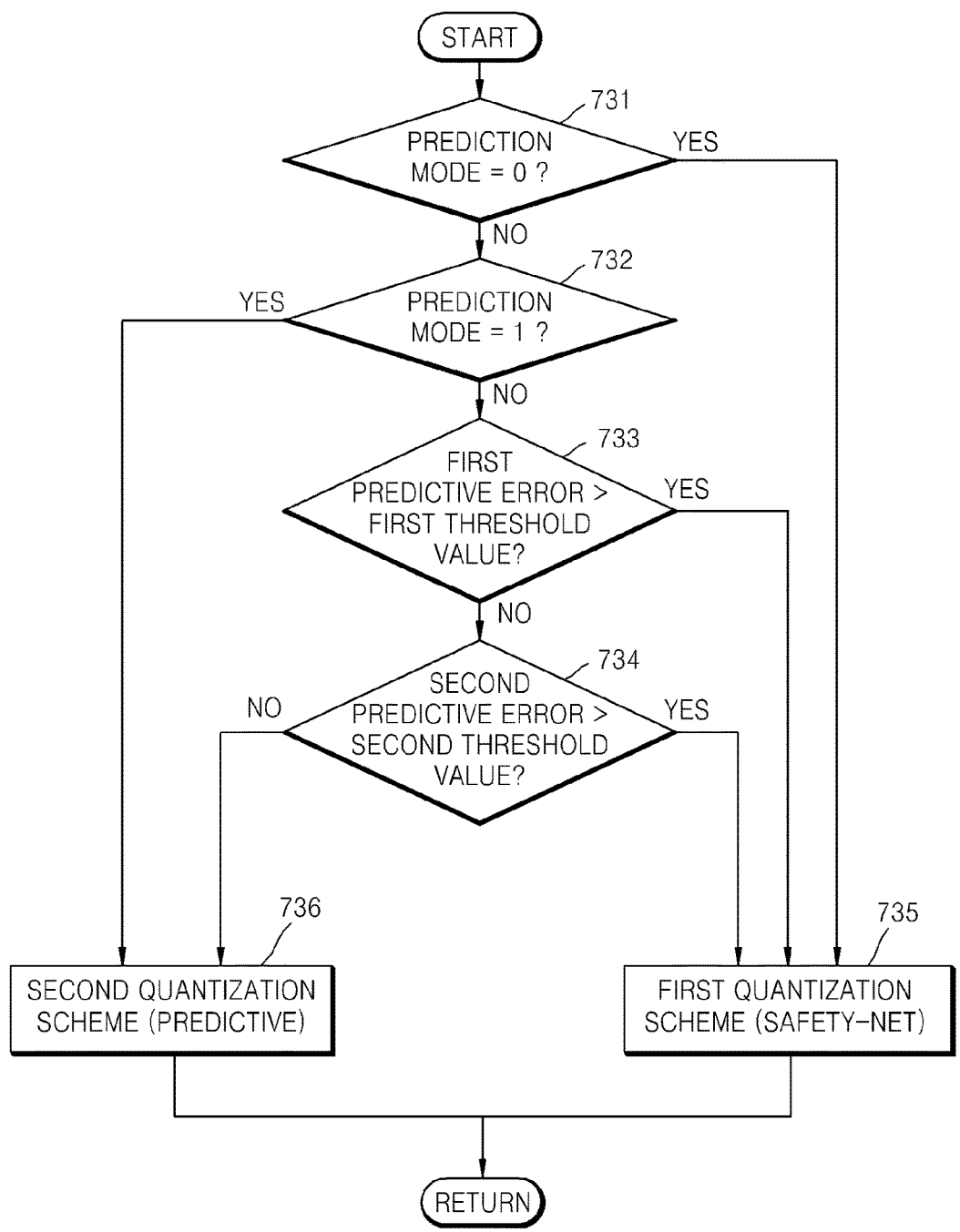

FIG. 7B is a flowchart illustrating an operation of the quantization path determiner of FIG. 6, according to another exemplary embodiment.

Referring to FIG. 7B, operations 731 to 733 are identical to operations 711 to 713 of FIG. 7A, and operation 734 in which a second predictive error between a frame immediately before a previous frame and a current frame to be compared with a second threshold is further included. The second threshold may be defined in advance as an optimal value experimentally or through simulations. For example, in a case of a WB having an order of 16, the second threshold may be set to (the first threshold×1.1).

As a result of the determination in operation 734, if the second predictive error is greater than or equal to the second threshold, the safety-net scheme, i.e., the first quantization scheme may be determined as the quantization path in operation 735. As a result of the determination in operation 734, if the second predictive error is not greater than the second threshold, the predictive scheme, i.e., the second quantization scheme may be determined as the quantization path in operation 736.

Although the number of prediction modes is 3 in FIGS. 7A and 7B, the present invention is not limited thereto.

Meanwhile, in determining a quantization scheme, additional information may be further used besides a prediction mode or a prediction error.

Figure 8:
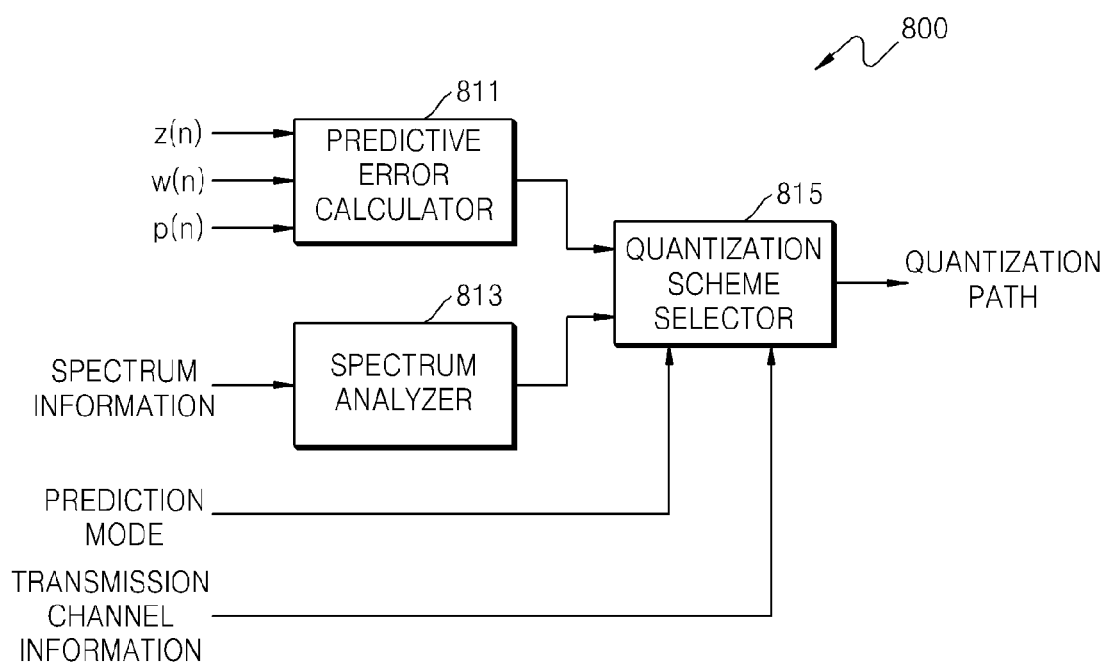
FIG. 8 is a block diagram of a quantization path selector according to another exemplary embodiment.

FIG. 8 is a block diagram of a quantization path determiner according to an exemplary embodiment. Referring to FIG. 8, the quantization path determiner 800 may include a predictive error calculator 811, a spectrum analyzer 813, and a quantization scheme selector 815.

Since the predictive error calculator 811 is identical to the predictive error calculator 611 of FIG. 6, a detailed description thereof is omitted.

The spectrum analyzer 813 may determine signal characteristics of a current frame by analyzing spectrum information. For example, in the spectrum analyzer 813, a weighted distance D between N (N is an integer greater than 1) previous frames and the current frame may be obtained by using spectral magnitude information in the frequency domain, and when the weighted distance is greater than a threshold, i.e., when inter-frame variation is great, the safety-net scheme may be determined as the quantization scheme. Since objects to be compared increases as N increases, complexity increases as N increases. The weighted distance D may be obtained using Equation 12 below. To obtain a weighted distance D with low complexity, the current frame may be compared with the previous frames by using only spectral magnitudes around a frequency defined by LSF/ISF. In this case, a mean value, a maximum value, or an intermediate value of magnitudes of M frequency bins around the frequency defined by LSF/ISF may be compared with the previous frames.

$$D_n = \sum_{i=0}^{M-1} w_{end}(i)(W_k(i) - W_{k-n}(i))^2, \text{ where } M = 16 \tag{12}$$

In Equation 12, a weighting function $W_k(i)$ may be obtained by Equation 3 described above and is identical to $W_1(n)$ of Equation 3. In $D_n$, n denotes a difference between a previous frame and a current frame. A case of n=1 indicates a weighted distance between an immediately previous frame and a current frame, and a case of n=2 indicates a weighted distance between a second previous frame and the current frame. When a value of $D_n$ is greater than the threshold, it may be determined that the current frame has the non-stationary characteristic.

The quantization scheme selector 815 may determine a quantization path of the current frame by receiving predictive errors provided from the predictive error calculator 811 and the signal characteristics, a prediction mode, and transmission channel information provided from the spectrum analyzer 813. For example, priorities may be designated to the information input to the quantization scheme selector 815 to be sequentially considered when a quantization path is selected. For example, when a high Frame Error Rate (FER) mode is included in the transmission channel information, a safety-net scheme selection ratio may be set relatively high, or only the safety-net scheme may be selected. The safety-net scheme selection ratio may be variably set by adjusting a threshold related to the predictive errors.

Figure 9:
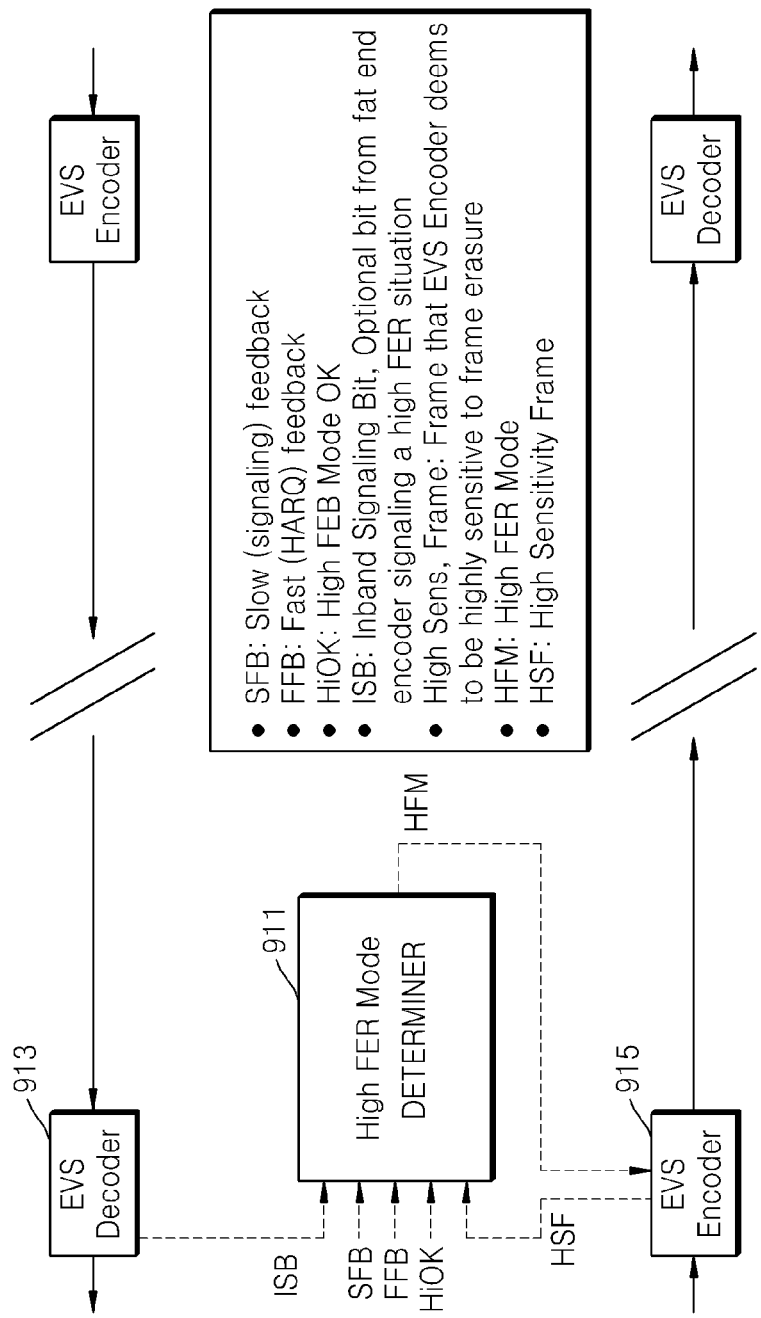
FIG. 9 illustrates information regarding a channel state transmittable in a network end when a codec service is provided.

FIG. 9 illustrates information regarding a channel state transmittable in a network end when a codec service is provided.

As the channel state is bad, channel errors increase, and as a result, inter-frame variation may be great, resulting in a frame error occurring. Thus, a selection ratio of the predictive scheme as a quantization path is reduced and a selection ratio of the safety-net scheme is increased. When the channel state is extremely bad, only the safety-net scheme may be used as the quantization path. To do this, a value indicating the channel state by combining a plurality of pieces of transmission channel information is expressed with one or more levels. A high level indicates a state in which a probability of a channel error is high. The simplest case is a case where the number of levels is 1, i.e., a case where the channel state is determined as a high FER mode by a high FER mode determiner 911 as shown in FIG. 9. Since the high FER mode indicates that the channel state is very unstable, encoding is performed by using the highest selection ratio of the safety-net scheme or using only the safety-net scheme. When the number of levels is plural, the selection ratio of the safety-net scheme may be set level-by-level.

Referring to FIG. 9, an algorithm of determining the high FER mode in the high FER mode determiner 911 may be performed through, for example, 4 pieces of information. In detail, the 4 pieces of information may be (1) Fast Feedback (FFB) information, which is a Hybrid Automatic Repeat Request (HARQ) feedback transmitted to a physical layer, (2) Slow Feedback (SFB) information, which is fed back from network signaling transmitted to a higher layer than the physical layer, (3) In-band Feedback (ISB) information, which is an in-band signaled from an EVS decoder 913 in a far end, and (4) High Sensitivity Frame (HSF) information, which is selected by an EVS encoder 915 with respect to a specific critical frame to be transmitted in a redundant fashion. While the FFB information and the SFB information are independent to an EVS codec, the ISB information and the HSF information are dependent to the EVS codec and may demand specific algorithms for the EVS codec.

The algorithm of determining the channel state as the high FER mode by using the 4 pieces of information, may be expressed by means of, for example, the following code.

```
Definitions
    SFBavg: Average error rate over Ns frames
    FFBavg: Average error rate over Nf frames
    ISBavg: Average error rate over Ni frames
    Ts: Threshold for slow feedback error rate
    Tf: Threshold for fast feedback error rate
    Ti: Threshold for inband feedback error rate
Set During Initialization
    Ns = 100
    Nf = 10
    Ni = 100
    Ts = 20
    Tf = 2
    Ti = 20
Algorithm
    Loop over each frame {
    HFM = 0;
    IF((HiOK) AND SFBavg > Ts) THEN HFM = 1;
    ELSE IF ((HiOK) AND FFBavg > Tf) THEN HFM = 1;
    ELSE IF ((HiOK) AND ISBavg > Ti) THEN HFM = 1;
    ELSE IF ((HiOK) AND (HSF = 1) THEN HFM = 1;
    Update SFBavg;
    Update FFBavg;
    Update ISBavg;
    }
```

As above, the EVS codec may be ordered to enter into the high FER mode based on analysis information processed with one or more of the 4 pieces of information. The analysis information may be, for example, (1) SFBavg derived from a calculated average error rate of Ns frames by using the SFB information, (2) FFBavg derived from a calculated average error rate of Nf frames by using the FFB information, and (3) ISBavg derived from a calculated average error rate of Ni frames by using the ISB information and thresholds Ts, Tf, and Ti of the SFB information, the FFB information, and the ISB information, respectively. It may be determined that the EVS codec is determined to enter into the high FER mode based on a result of comparing SFBavg, FFBavg, and ISBavg with the thresholds Ts, Tf, and Ti, respectively. For all conditions, HiOK on whether the each codec commonly support the high FER mode may be checked.

The high FER mode determiner 911 may be included as a component of the EVS encoder 915 or an encoder of another format. Alternatively, the high FER mode determiner 911 may be implemented in another external device other than the component of the EVS encoder 915 or an encoder of another format.

Figure 10:
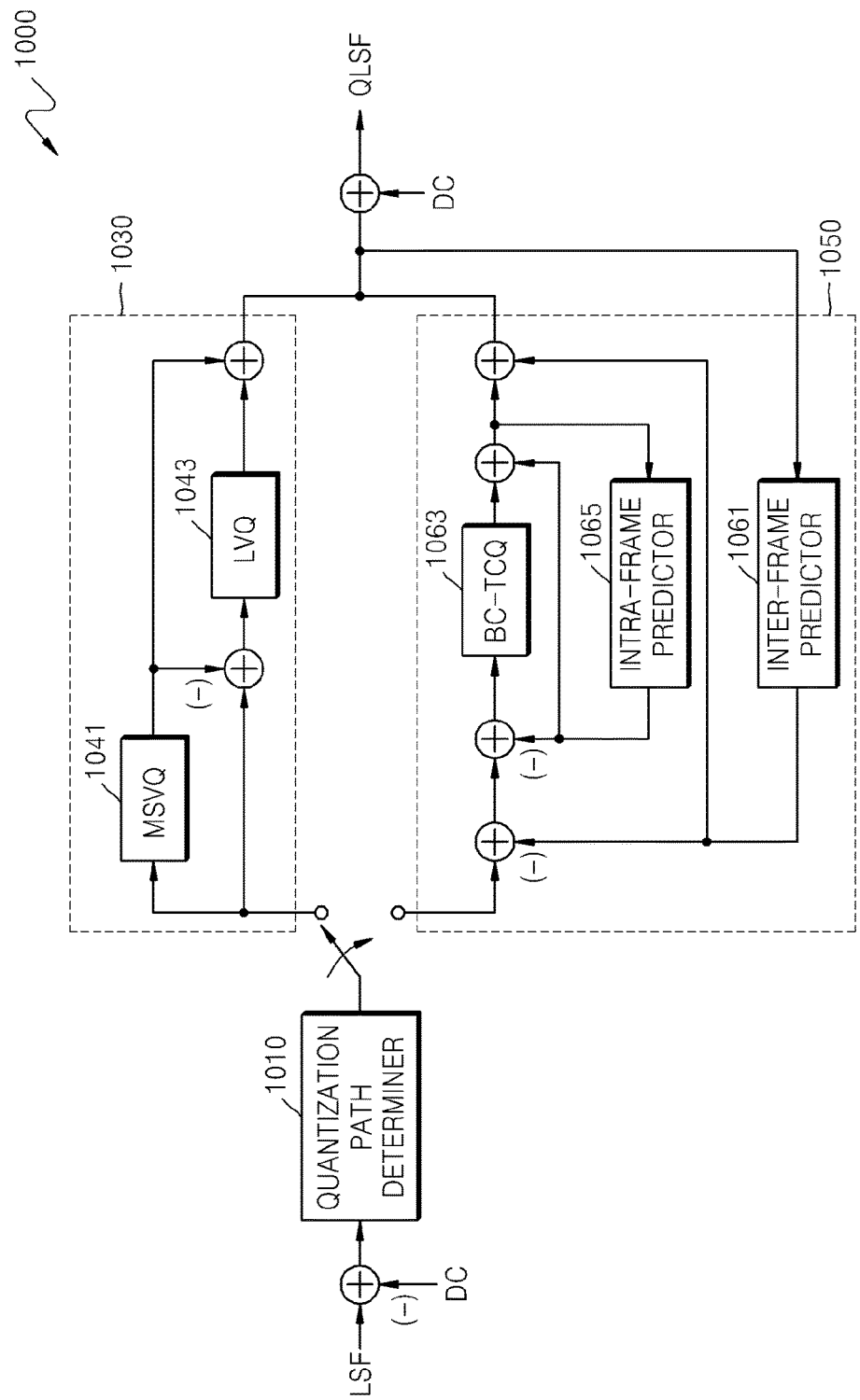
FIG. 10 is a block diagram of an LPC coefficient quantizer according to another exemplary embodiment.

FIG. 10 is a block diagram of an LPC coefficient quantizer 1000 according to another exemplary embodiment.

Referring to FIG. 10, the LPC coefficient quantizer 1000 may include a quantization path determiner 1010, a first quantization scheme 1030, and a second quantization scheme 1050.

The quantization path determiner 1010 determines one of a first path including the safety-net scheme and a second path including the predictive scheme as a quantization path of a current frame, based on at least one of a predictive error and a coding mode.

The first quantization scheme 1030 performs quantization without using the inter-frame prediction when the first path is determined as the quantization path and may include a Multi-Stage Vector Quantizer (MSVQ) 1041 and a Lattice Vector Quantizer (LVQ) 1043. The MSVQ 1041 may preferably include two stages. The MSVQ 1041 generates a quantization index by roughly performing vector quantization of LSF coefficients from which a DC value is removed. The LVQ 1043 generates a quantization index by performing quantization by receiving LSF quantization errors between inverse QLSF coefficients output from the MSVQ 1041 and the LSF coefficients from which a DC value is removed. Final QLSF coefficients are generated by adding an output of the MSVQ 1041 and an output of the LVQ 1043 and then adding a DC value to the addition result. The first quantization scheme 1030 may implement a very efficient quantizer structure by using a combination of the MSVQ 1041 having excellent performance at a low bit rate though a large size of memory is necessary for a codebook, and the LVQ 1043 that is efficient at the low bit rate with a small size of memory and low complexity.

The second quantization scheme 1050 performs quantization using the inter-frame prediction when the second path is determined as the quantization path and may include a BC-TCQ 1063, which has an intra-frame predictor 1065, and an inter-frame predictor 1061. The inter-frame predictor 1061 may use any one of the AR method and the MA method. For example, a first order AR method is applied. A predictive coefficient is defined in advance, and a vector selected as an optimal vector in a previous frame is used as a past vector for prediction. LSF predictive errors obtained from predictive values of the inter-frame predictor 1061 are quantized by the BC-TCQ 1063 having the intra-frame predictor 1065. Accordingly, a characteristic of the BC-TCQ 1063 having excellent quantization performance with a small size of memory and low complexity at a high bit rate may be maximized.

As a result, when the first quantization scheme 1030 and the second quantization scheme 1050 are used, an optimal quantizer may be implemented in correspondence with characteristics of an input speech signal.

For example, when 41 bits are used in the LPC coefficient quantizer 1000 to quantize a speech signal in the GC mode with a WB of 8-KHz, 12 bits and 28 bits may be allocated to the MSVQ 1041 and the LVQ 1043 of the first quantization scheme 1030, respectively, except for 1 bit indicating quantization path information. In addition, 40 bits may be allocated to the BC-TCQ 1063 of the second quantization scheme 1050 except for 1 bit indicating quantization path information.

Table 2 shows an example in which bits are allocated to a WB speech signal of an 8-KHz band.

TABLE 2

| Coding mode | LSF/ISF quantization scheme | MSVQ-LVQ [bits] | BC-TCQ [bits] |
|---|---|---|---|
| GC, WB | Safety-net | 40/41 | — |
|  | Predictive | — | 40/41 |
| TC, WB | Safety-net | 41 | — |

Figure 11:
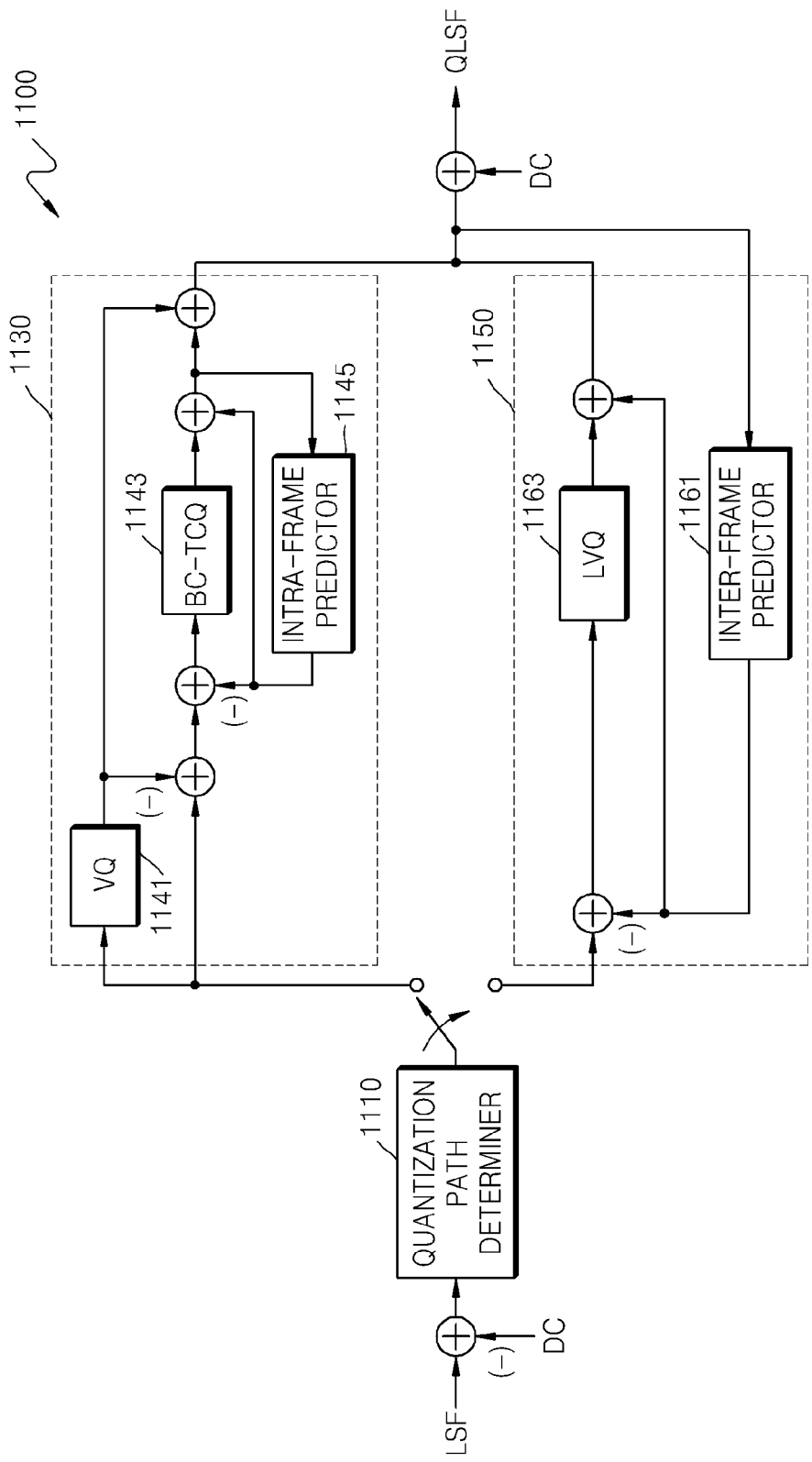
FIG. 11 is a block diagram of an LPC coefficient quantizer according to another exemplary embodiment.

FIG. 11 is a block diagram of an LPC coefficient quantizer according to another exemplary embodiment. The LPC coefficient quantizer 1100 shown in FIG. 11 has a structure opposite to that shown in FIG. 10.

Referring to FIG. 11, the LPC coefficient quantizer 1100 may include a quantization path determiner 1110, a first quantization scheme 1130, and a second quantization scheme 1150.

The quantization path determiner 1110 determines one of a first path including the safety-net scheme and a second path including the predictive scheme as a quantization path of a current frame, based on at least one of a predictive error and a prediction mode.

The first quantization scheme 1130 performs quantization without using the inter-frame prediction when the first path is selected as the quantization path and may include a Vector Quantizer (VQ) 1141 and a BC-TCQ 1143 having an intra-frame predictor 1145. The VQ 1141 generates a quantization index by roughly performing vector quantization of LSF coefficients from which a DC value is removed. The BC-TCQ 1143 generates a quantization index by performing quantization by receiving LSF quantization errors between inverse QLSF coefficients output from the VQ 1141 and the LSF coefficients from which a DC value is removed. Final QLSF coefficients are generated by adding an output of the VQ 1141 and an output of the BC-TCQ 1143 and then adding a DC value to the addition result.

The second quantization scheme 1150 performs quantization using the inter-frame prediction when the second path is determined as the quantization path and may include an LVQ 1163 and an inter-frame predictor 1161. The inter-frame predictor 1161 may be implemented the same as or similar to that in FIG. 10. LSF predictive errors obtained from predictive values of the inter-frame predictor 1161 are quantized by the LVQ 1163.

Accordingly, since the number of bits allocated to the BC-TCQ 1143 is small, the BC-TCQ 1143 has low complexity, and since the LVQ 1163 has low complexity at a high bit rate, quantization may be generally performed with low complexity.

For example, when 41 bits are used in the LPC coefficient quantizer 1100 to quantize a speech signal in the GC mode with a WB of 8-KHz, 6 bits and 34 bits may be allocated to the VQ 1141 and the BC-TCQ 1143 of the first quantization scheme 1130, respectively, except for 1 bit indicating quantization path information. In addition, 40 bits may be allocated to the LVQ 1163 of the second quantization scheme 1150 except for 1 bit indicating quantization path information.

Table 3 shows an example in which bits are allocated to a WB speech signal of an 8-KHz band.

TABLE 3

| Coding mode | LSF/ISF quantization scheme | MSVQ-LVQ [bits] | BC-TCQ [bits] |
|---|---|---|---|
| GC, WB | Safety-net | — | 40/41 |
|  | Predictive | 40/41 | — |
| TC, WB | Safety-net | — | 41 |

An optimal index related to the VQ 1141 used in most coding modes may be obtained by searching for an index for minimizing $E_{werr}(p)$ of Equation 13.

$$E_{werr}(p) = \sum_{i=0}^{15} W_{end}(i)[r(i) - c_i^p(i)]^2 \quad (13)$$

In Equation 13, w(i) denotes a weighting function determined in the weighting function determiner (313 of FIG. 3), r(i) denotes an input of the VQ 1141, and c(i) denotes an output of the VQ 1141. That is, an index for minimizing weighted distortion between r(i) and c(i) is obtained.

A distortion measure d(x, y) used in the BC-TCQ 1143 may be represented by Equation 14.

$$d(x, y) = \frac{1}{N} \sum_{k=1}^{N} (x_k - y_k)^2 \quad (14)$$

According to an exemplary embodiment, the weighted distortion may be obtained by applying a weighting function $w_k$ to the distortion measure d(x, y) as represented by Equation 15.

$$d_w(x, y) = \frac{1}{N} \sum_{k=1}^{N} w_k (x_k - y_k)^2 \quad (15)$$

That is, an optimal index may be obtained by obtaining weighted distortion in all stages of the BC-TCQ 1143.

Figure 12:
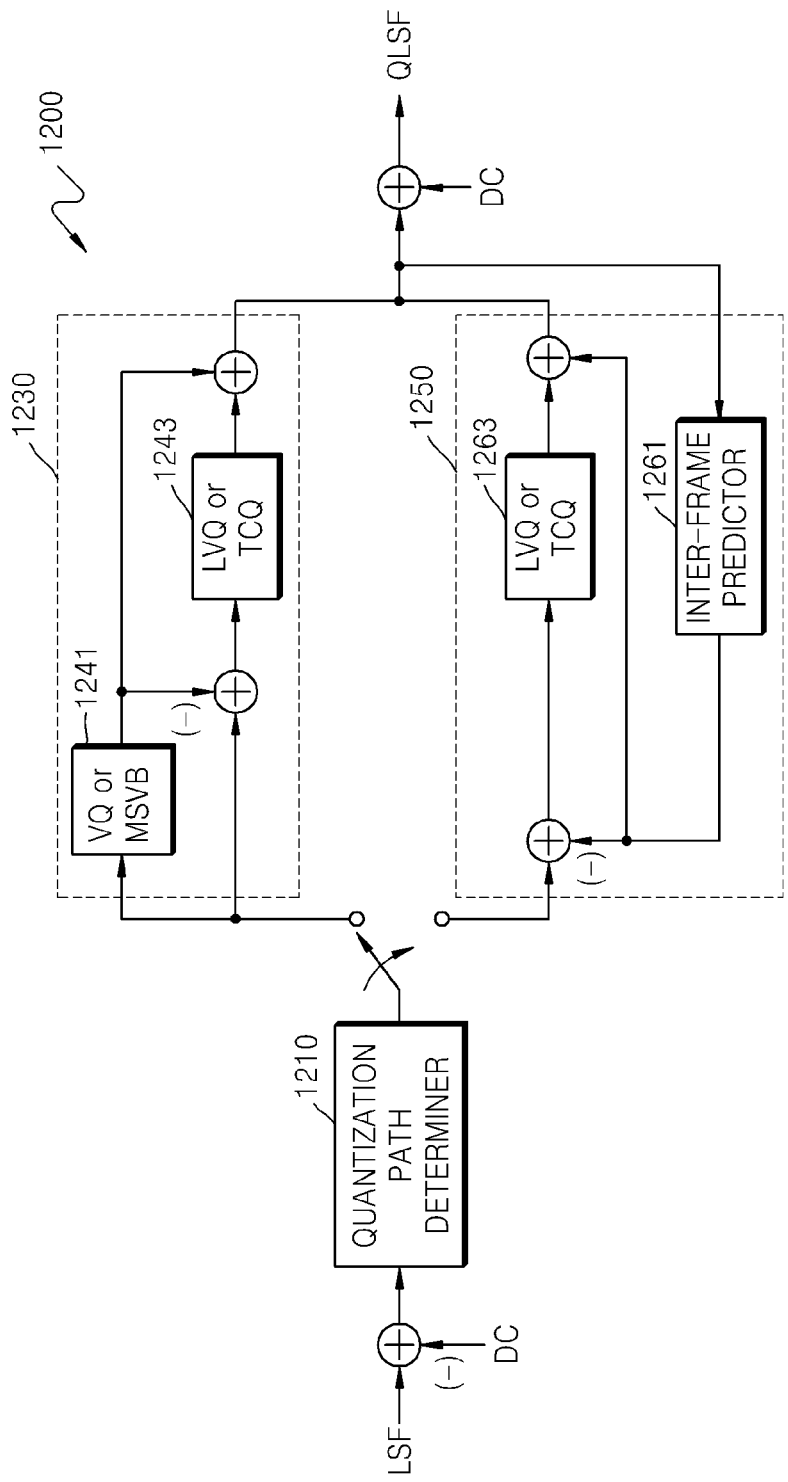
FIG. 12 is a block diagram of an LPC coefficient quantizer according to another exemplary embodiment.

FIG. 12 is a block diagram of an LPC coefficient quantizer according to another exemplary embodiment.

Referring to FIG. 12, the LPC coefficient quantizer 1200 may include a quantization path determiner 1210, a first quantization scheme 1230, and a second quantization scheme 1250.

The quantization path determiner 1210 determines one of a first path including the safety-net scheme and a second path including the predictive scheme as a quantization path of a current frame, based on at least one of a predictive error and a prediction mode.

The first quantization scheme 1230 performs quantization without using the inter-frame prediction when the first path is determined as the quantization path and may include a VQ or MSVQ 1241 and an LVQ or TCQ 1243. The VQ or MSVQ 1241 generates a quantization index by roughly performing vector quantization of LSF coefficients from which a DC value is removed. The LVQ or TCQ 1243 generates a quantization index by performing quantization by receiving LSF quantization errors between inverse QLSF coefficients output from the VQ 1141 and the LSF coefficients from which a DC value is removed. Final QLSF coefficients are generated by adding an output of the VQ or MSVQ 1241 and an output of the LVQ or TCQ 1243 and then adding a DC value to the addition result. Since the VQ or MSVQ 1241 has a good bit error rate although the VQ or MSVQ 1241 has high complexity and uses a great amount of memory, the number of stages of the VQ or MSVQ 1241 may increase from 1 to n by taking the overall complexity into account. For example, when only a first stage is used, the VQ or MSVQ 1241 becomes a VQ, and when two or more stages are used, the VQ or MSVQ 1241 becomes an MSVQ. In addition, since the LVQ or TCQ 1243 has low complexity, the LSF quantization errors may be efficiently quantized.

The second quantization scheme 1250 performs quantization using the inter-frame prediction when the second path is determined as the quantization path and may include an inter-frame predictor 1261 and an LVQ or TCQ 1263. The inter-frame predictor 1261 may be implemented the same as or similar to that in FIG. 10. LSF predictive errors obtained from predictive values of the inter-frame predictor 1261 are quantized by the LVQ or TCQ 1263. Likewise, since the LVQ or TCQ 1243 has low complexity, the LSF predictive errors may be efficiently quantized. Accordingly, quantization may be generally performed with low complexity.

Figure 13:
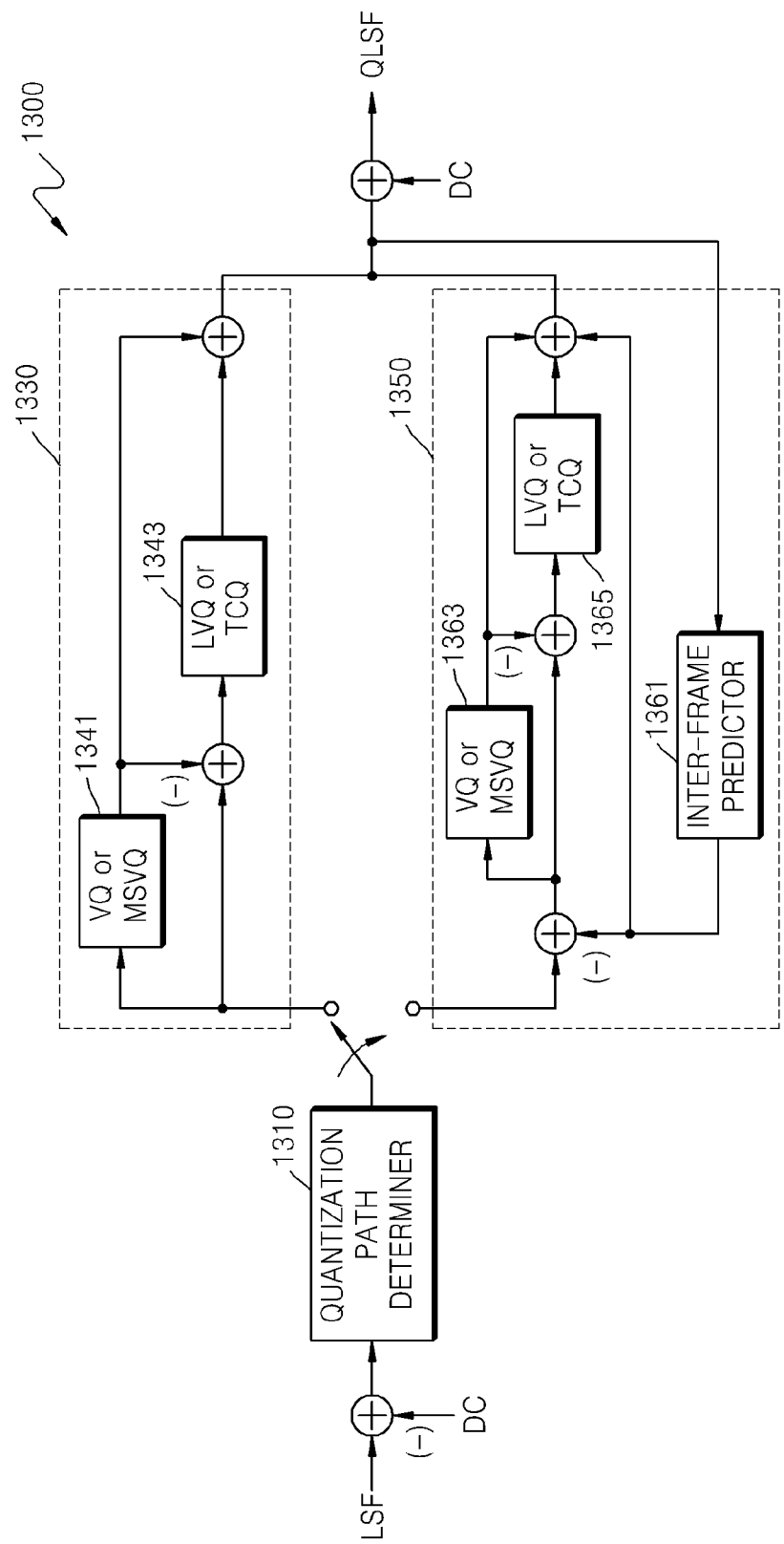
FIG. 13 is a block diagram of an LPC coefficient quantizer according to another exemplary embodiment.

FIG. 13 is a block diagram of an LPC coefficient quantizer according to another exemplary embodiment.

Referring to FIG. 13, the LPC coefficient quantizer 1300 may include a quantization path determiner 1310, a first quantization scheme 1330, and a second quantization scheme 1350.

The quantization path determiner 1310 determines one of a first path including the safety-net scheme and a second path including the predictive scheme as a quantization path of a current frame, based on at least one of a predictive error and a prediction mode.

The first quantization scheme 1330 performs quantization without using the inter-frame prediction when the first path is determined as the quantization path, and since the first quantization scheme 1330 is the same as that shown in FIG. 12, a description thereof is omitted.

The second quantization scheme 1350 performs quantization using the inter-frame prediction when the second path is determined as the quantization path and may include an inter-frame predictor 1361, a VQ or MSVQ 1363, and an LVQ or TCQ 1365. The inter-frame predictor 1361 may be implemented the same as or similar to that in FIG. 10. LSF predictive errors obtained using predictive values of the inter-frame predictor 1361 are roughly quantized by the VQ or MSVQ 1363. An error vector between the LSF predictive errors and inverse-quantized LSF predictive errors output from the VQ or MSVQ 1363 is quantized by the LVQ or TCQ 1365. Likewise, since the LVQ or TCQ 1365 has low complexity, the LSF predictive errors may be efficiently quantized. Accordingly, quantization may be generally performed with low complexity.

Figure 14:
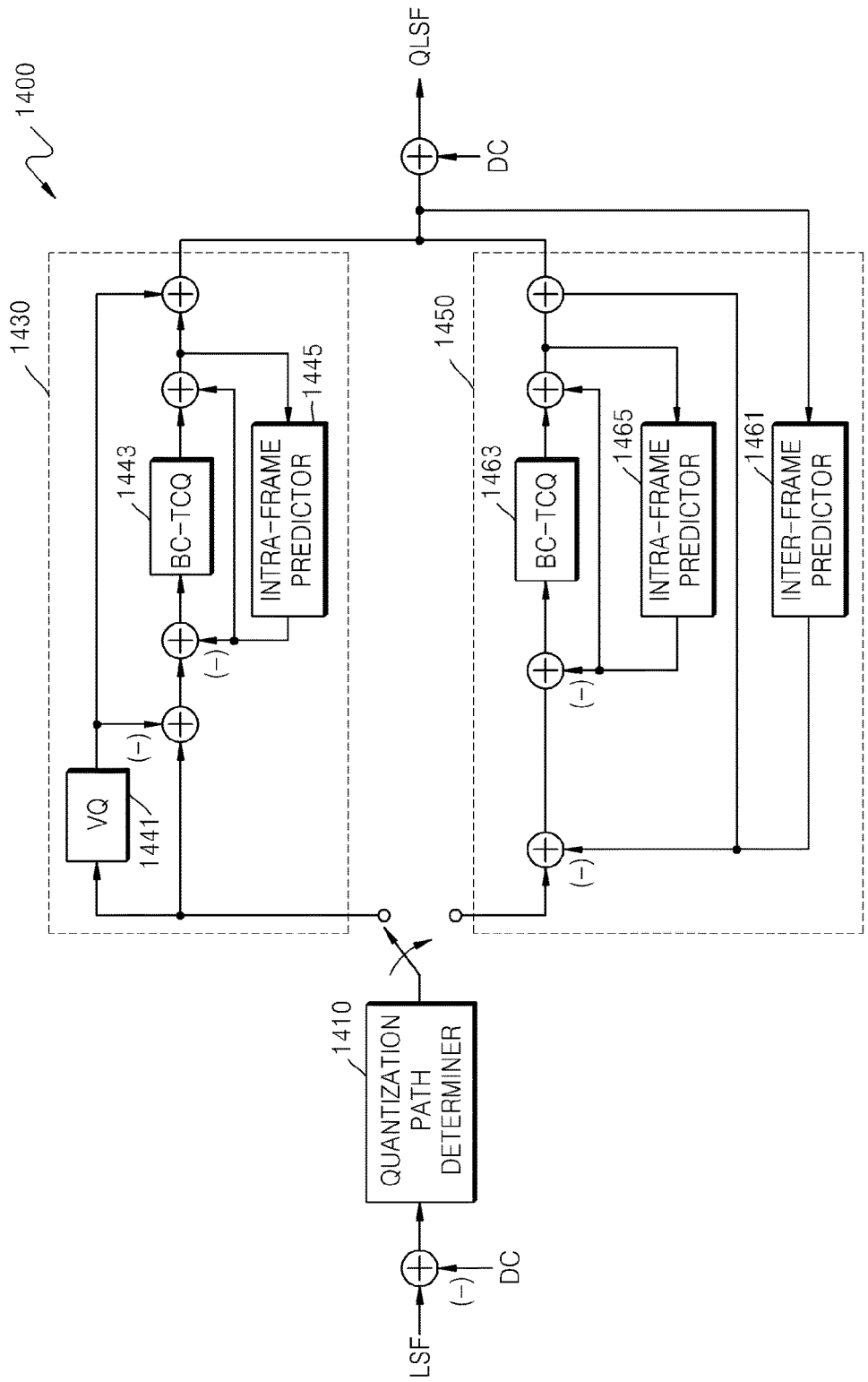
FIG. 14 is a block diagram of an LPC coefficient quantizer according to another exemplary embodiment.

FIG. 14 is a block diagram of an LPC coefficient quantizer according to another exemplary embodiment. Compared with the LPC coefficient quantizer 1200 shown in FIG. 12, the LPC coefficient quantizer 1400 has a difference in that a first quantization scheme 1430 includes a BC-TCQ 1443 having an intra-frame predictor 1445 instead of the LVQ or TCQ 1243, and a second quantization scheme 1450 includes a BC-TCQ 1463 having an intra-frame predictor 1465 instead of the LVQ or TCQ 1263.

For example, when 41 bits are used in the LPC coefficient quantizer 1400 to quantize a speech signal in the GC mode with a WB of 8-KHz, 5 bits and 35 bits may be allocated to a VQ 1441 and the BC-TCQ 1443 of the first quantization scheme 1430, respectively, except for 1 bit indicating quantization path information. In addition, 40 bits may be allocated to the BC-TCQ 1463 of the second quantization scheme 1450 except for 1 bit indicating quantization path information.

Figure 15:
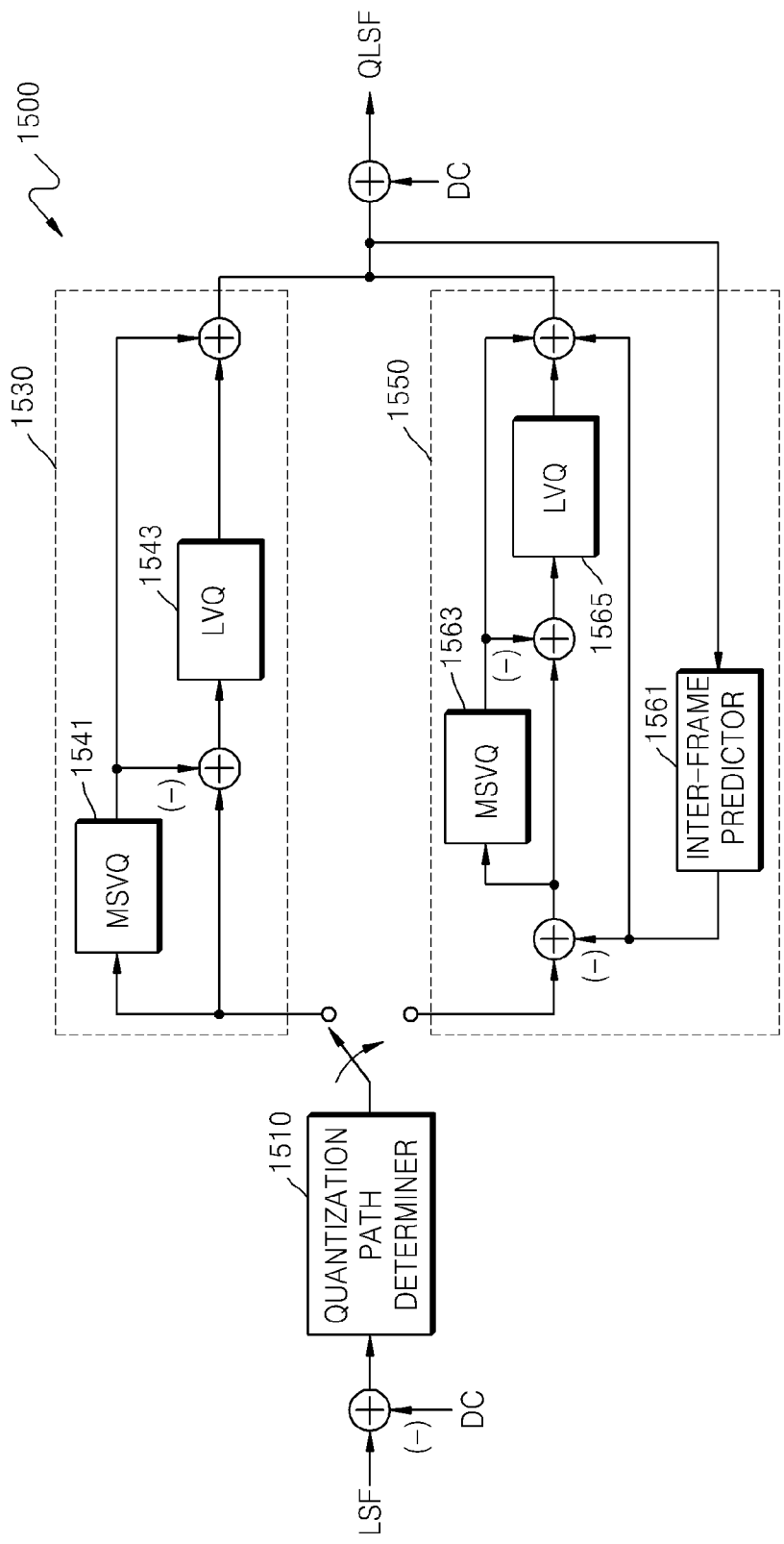
FIG. 15 is a block diagram of an LPC coefficient quantizer according to another exemplary embodiment.

FIG. 15 is a block diagram of an LPC coefficient quantizer according to another exemplary embodiment. The LPC coefficient quantizer 1500 shown in FIG. 15 is a concrete example of the LPC coefficient quantizer 1300 shown in FIG. 13, wherein an MSVQ 1541 of a first quantization scheme 1530 and an MSVQ 1563 of a second quantization scheme 1550 have two stages.

For example, when 41 bits are used in the LPC coefficient quantizer 1500 to quantize a speech signal in the GC mode with a WB of 8-KHz, 6+6=12 bits and 28 bits may be allocated to the two-stage MSVQ 1541 and an LVQ 1543 of the first quantization scheme 1530, respectively, except for 1 bit indicating quantization path information. In addition, 5+5=10 bits and 30 bits may be allocated to the two-stage MSVQ 1563 and an LVQ 1565 of the second quantization scheme 1550, respectively.

Figure 16A:
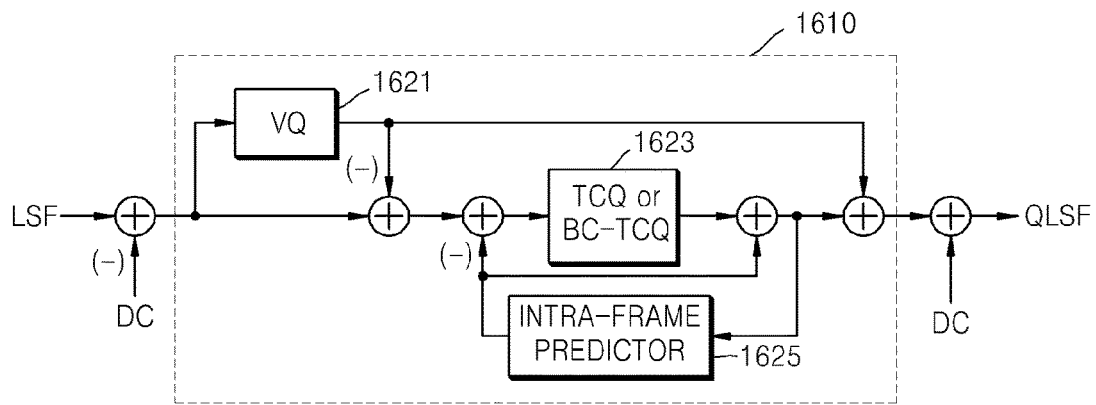
FIGS. 16A and 16B are block diagrams of LPC coefficient quantizers according to other exemplary embodiments.
Figure 16B:
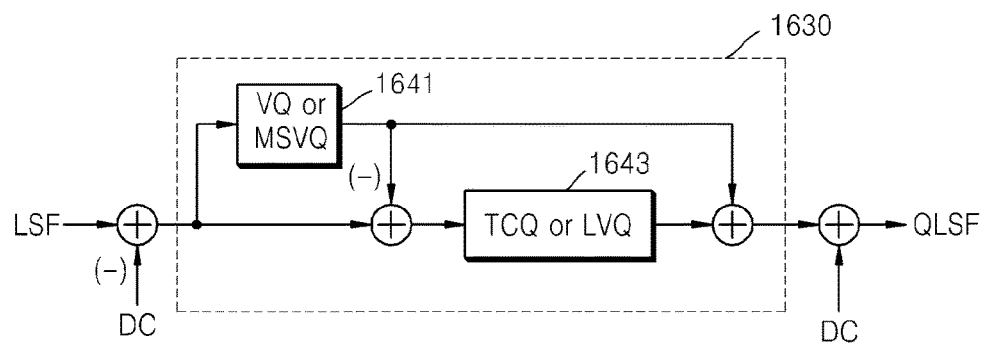

FIGS. 16A and 16B are block diagrams of LPC coefficient quantizers according to other exemplary embodiments. In particular, the LPC coefficient quantizers 1610 and 1630 shown in FIGS. 16A and 16B, respectively, may be used to form the safety-net scheme, i.e., the first quantization scheme.

The LPC coefficient quantizer 1610 shown in FIG. 16A may include a VQ 1621 and a TCQ or BC-TCQ 1623 having an intra-frame predictor 1625, and the LPC coefficient quantizer 1630 shown in FIG. 16B may include a VQ or MSVQ 1641 and a TCQ or LVQ 1643.

Referring to FIGS. 16A and 16B, the VQ 1621 or the VQ or MSVQ 1641 roughly quantizes the entire input vector with a small number of bits, and the TCQ or BC-TCQ 1623 or the TCQ or LVQ 1643 precisely quantizes LSF quantization errors.

When only the safety-net scheme, i.e., the first quantization scheme, is used for every frame, a List Viterbi Algorithm (LVA) method may be applied for additional performance improvement. That is, since there is room in terms of complexity compared with a switching method when only the first quantization scheme is used, the LVA method achieving the performance improvement by increasing complexity in a search operation may be applied. For example, by applying the LVA method to a BC-TCQ, it may be set so that complexity of an LVA structure is lower than complexity of a switching structure even though the complexity of the LVA structure increases.

Figure 17A:
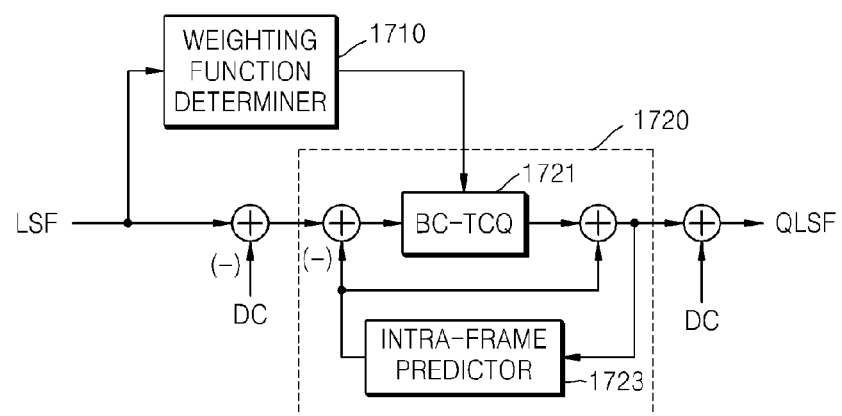
FIGS. 17A to 17C are block diagrams of LPC coefficient quantizers according to other exemplary embodiments.
Figure 17B:
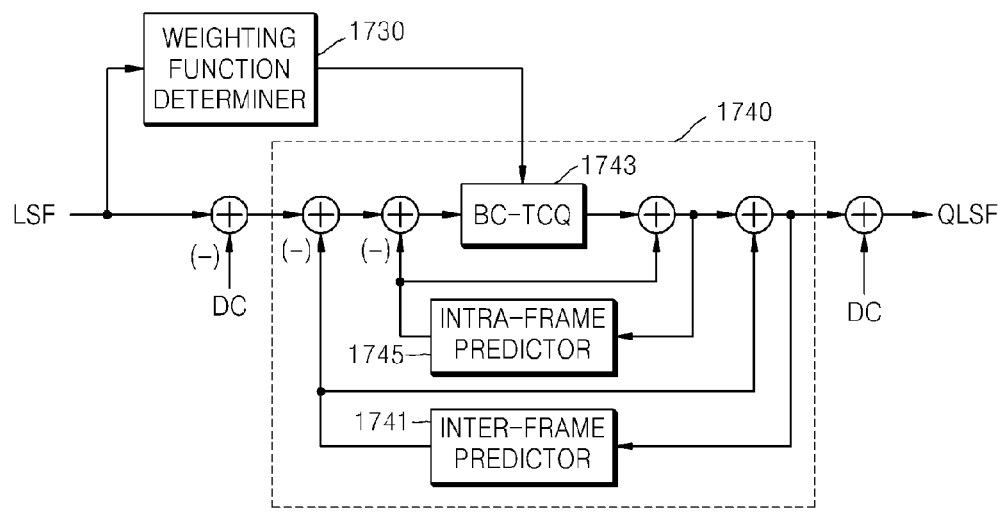
Figure 17C:
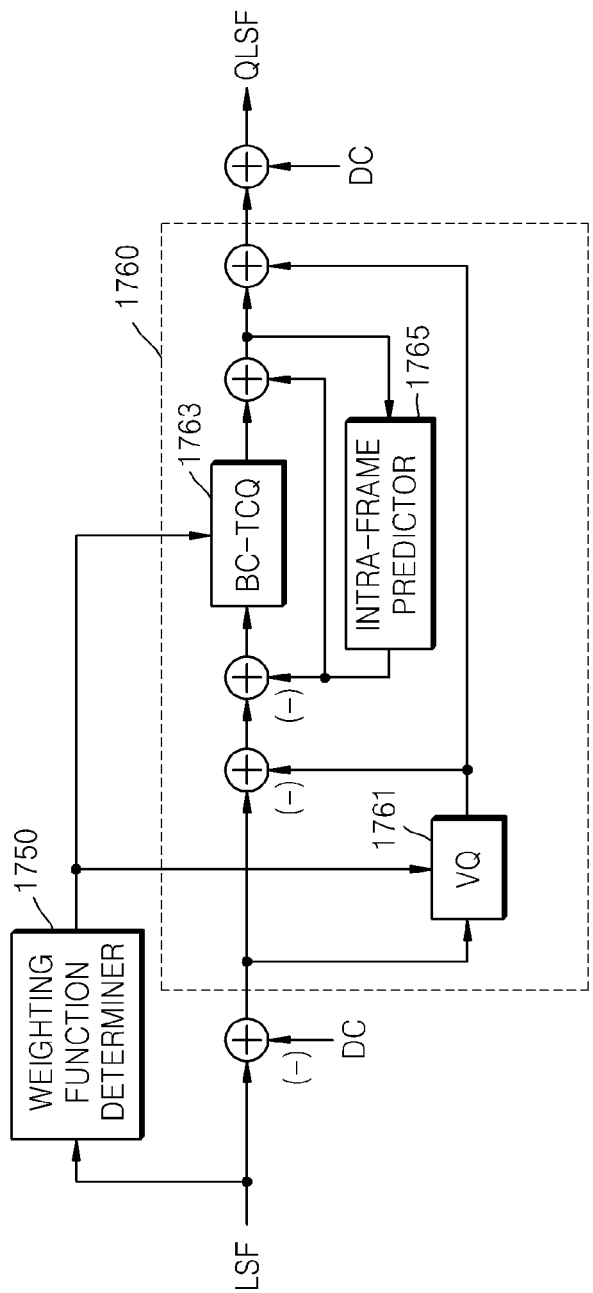

FIGS. 17A to 17C are block diagrams of LPC coefficient quantizers according to other exemplary embodiments, which particularly have a structure of a BC-TCQ using a weighting function.

Referring to FIG. 17A, the LPC coefficient quantizer may include a weighting function determiner 1710 and a quantization scheme 1720 including a BC-TCQ 1721 having an intra-frame predictor 1723.

Referring to FIG. 17B, the LPC coefficient quantizer may include a weighting function determiner 1730 and a quantization scheme 1740 including a BC-TCQ 1743, which has an intra-frame predictor 1745, and an inter-frame predictor 1741. Here, 40 bits may be allocated to the BC-TCQ 1743.

Referring to FIG. 17C, the LPC coefficient quantizer may include a weighting function determiner 1750 and a quantization scheme 1760 including a BC-TCQ 1763, which has an intra-frame predictor 1765, and a VQ 1761. Here, 5 bits and 40 bits may be allocated to the VQ 1761 and the BC-TCQ 1763, respectively.

FIG. 18 is a block diagram of an LPC coefficient quantizer according to another exemplary embodiment.

Referring to FIG. 18, the LPC coefficient quantizer 1800 may include a first quantization scheme 1810, a second quantization scheme 1830, and a quantization path determiner 1850.

The first quantization scheme 1810 performs quantization without using the inter-frame prediction and may use a combination of an MSVQ 1821 and an LVQ 1823 for quantization performance improvement. The MSVQ 1821 may preferably include two stages. The MSVQ 1821 generates a quantization index by roughly performing vector quantization of LSF coefficients from which a DC value is removed. The LVQ 1823 generates a quantization index by performing quantization by receiving LSF quantization errors between inverse QLSF coefficients output from the MSVQ 1821 and the LSF coefficients from which a DC value is removed. Final QLSF coefficients are generated by adding an output of the MSVQ 1821 and an output of the LVQ 1823 and then adding a DC value to the addition result. The first quantization scheme 1810 may implement a very efficient quantizer structure by using a combination of the MSVQ 1821 having excellent performance at a low bit rate and the LVQ 1823 that is efficient at the low bit rate.

The second quantization scheme 1830 performs quantization using the inter-frame prediction and may include a BC-TCQ 1843, which has an intra-frame predictor 1845, and an inter-frame predictor 1841. LSF predictive errors obtained using predictive values of the inter-frame predictor 1841 are quantized by the BC-TCQ 1843 having the intra-frame predictor 1845. Accordingly, a characteristic of the BC-TCQ 1843 having excellent quantization performance at a high bit rate may be maximized.

The quantization path determiner 1850 determines one of an output of the first quantization scheme 1810 and an output of the second quantization scheme 1830 as a final quantization output by taking a prediction mode and weighted distortion into account.

As a result, when the first quantization scheme 1810 and the second quantization scheme 1830 are used, an optimal quantizer may be implemented in correspondence with characteristics of an input speech signal. For example, when 43 bits are used in the LPC coefficient quantizer 1800 to quantize a speech signal in the VC mode with a WB of 8-KHz, 12 bits and 30 bits may be allocated to the MSVQ 1821 and the LVQ 1823 of the first quantization scheme 1810, respectively, except for 1 bit indicating quantization path information. In addition, 42 bits may be allocated to the BC-TCQ 1843 of the second quantization scheme 1830 except for 1 bit indicating quantization path information.

Table 4 shows an example in which bits are allocated to a WB speech signal of an 8-KHz band.

| Coding mode | LSF/ISF quantization scheme | MSVQ-LVQ [bits] | BC-TCQ [bits] |
| --- | --- | --- | --- |
| VC, WB | Safety-net | 43 | — |
|  | Predictive | — | 43 |

Figure 19:
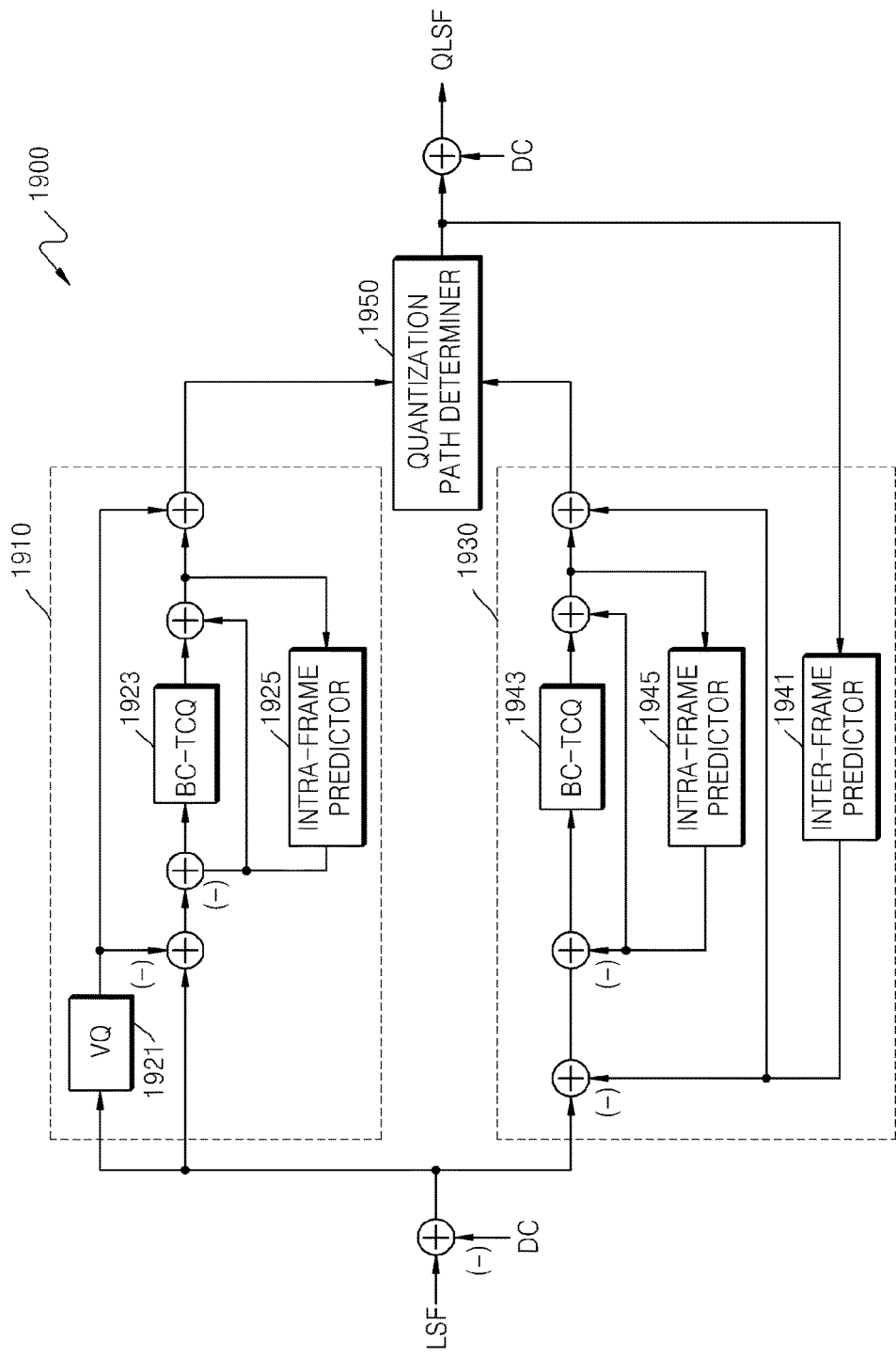
FIG. 19 is a block diagram of an LPC coefficient quantizer according to another exemplary embodiment.

FIG. 19 is a block diagram of an LPC coefficient quantizer according to another exemplary embodiment.

Referring to FIG. 19, the LPC coefficient quantizer 1900 may include a first quantization scheme 1910, a second quantization scheme 1930, and a quantization path determiner 1950.

The first quantization scheme 1910 performs quantization without using the inter-frame prediction and may use a combination of a VQ 1921 and a BC-TCQ 1923 having an intra-frame predictor 1925 for quantization performance improvement.

The second quantization scheme 1930 performs quantization using the inter-frame prediction and may include a BC-TCQ 1943, which has an intra-frame predictor 1945, and an inter-frame predictor 1941.

The quantization path determiner 1950 determines a quantization path by receiving a prediction mode and weighted distortion using optimally quantized values obtained by the first quantization scheme 1910 and the second quantization scheme 1930. For example, it is determined whether a prediction mode of a current frame is 0, i.e., whether a speech signal of the current frame has a non-stationary characteristic. When variation of the speech signal of the current frame is great as in the TC mode or the UC mode, since inter-frame prediction is difficult, the safety-net scheme, i.e., the first quantization scheme 1910, is always determined as the quantization path.

If the prediction mode of the current frame is 1, i.e., if the speech signal of the current frame is in the GC mode or the VC mode not having the non-stationary characteristic, the quantization path determiner 1950 determines one of the first quantization scheme 1910 and the second quantization scheme 1930 as the quantization path by taking predictive errors into account. To do this, weighted distortion of the first quantization scheme 1910 is considered first of all so that the LPC coefficient quantizer 1900 is robust to frame errors. That is, if a weighted distortion value of the first quantization scheme 1910 is less than a predefined threshold, the first quantization scheme 1910 is selected regardless of a weighted distortion value of the second quantization scheme 1930. In addition, instead of a simple selection of a quantization scheme having a less weighted distortion value, the first quantization scheme 1910 is selected by considering frame errors in a case of the same weighted distortion value. If the weighted distortion value of the first quantization scheme 1910 is a certain number of times greater than the weighted distortion value of the second quantization scheme 1930, the second quantization scheme 1930 may be selected. The certain number of times may be, for example, set to 1.15. As such, when the quantization path is determined, a quantization index generated by a quantization scheme of the determined quantization path is transmitted.

By considering that the number of prediction modes is 3, it may be implemented to select the first quantization scheme 1910 when the prediction mode is 0, select the second quantization scheme 1930 when the prediction mode is 1, and select one of the first quantization scheme 1910 and the second quantization scheme 1930 when the prediction mode is 2, as the quantization path.

For example, when 37 bits are used in the LPC coefficient quantizer 1900 to quantize a speech signal in the GC mode with a WB of 8-KHz, 2 bits and 34 bits may be allocated to the VQ 1921 and the BC-TCQ 1923 of the first quantization scheme 1910, respectively, except for 1 bit indicating quantization path information. In addition, 36 bits may be allocated to the BC-TCQ 1943 of the second quantization scheme 1930 except for 1 bit indicating quantization path information.

Table 5 shows an example in which bits are allocated to a WB speech signal of an 8-KHz band.

TABLE 5

| Coding mode | LSF/ISF quantization scheme | Number of used bits |
| --- | --- | --- |
| VC, WB | Safety-net | 43 |
|  | Predictive | 43 |
| GC, WB | Safety-net | 37 |
|  | Predictive | 37 |
| TC, WB | Safety-net | 44 |

Figure 20:
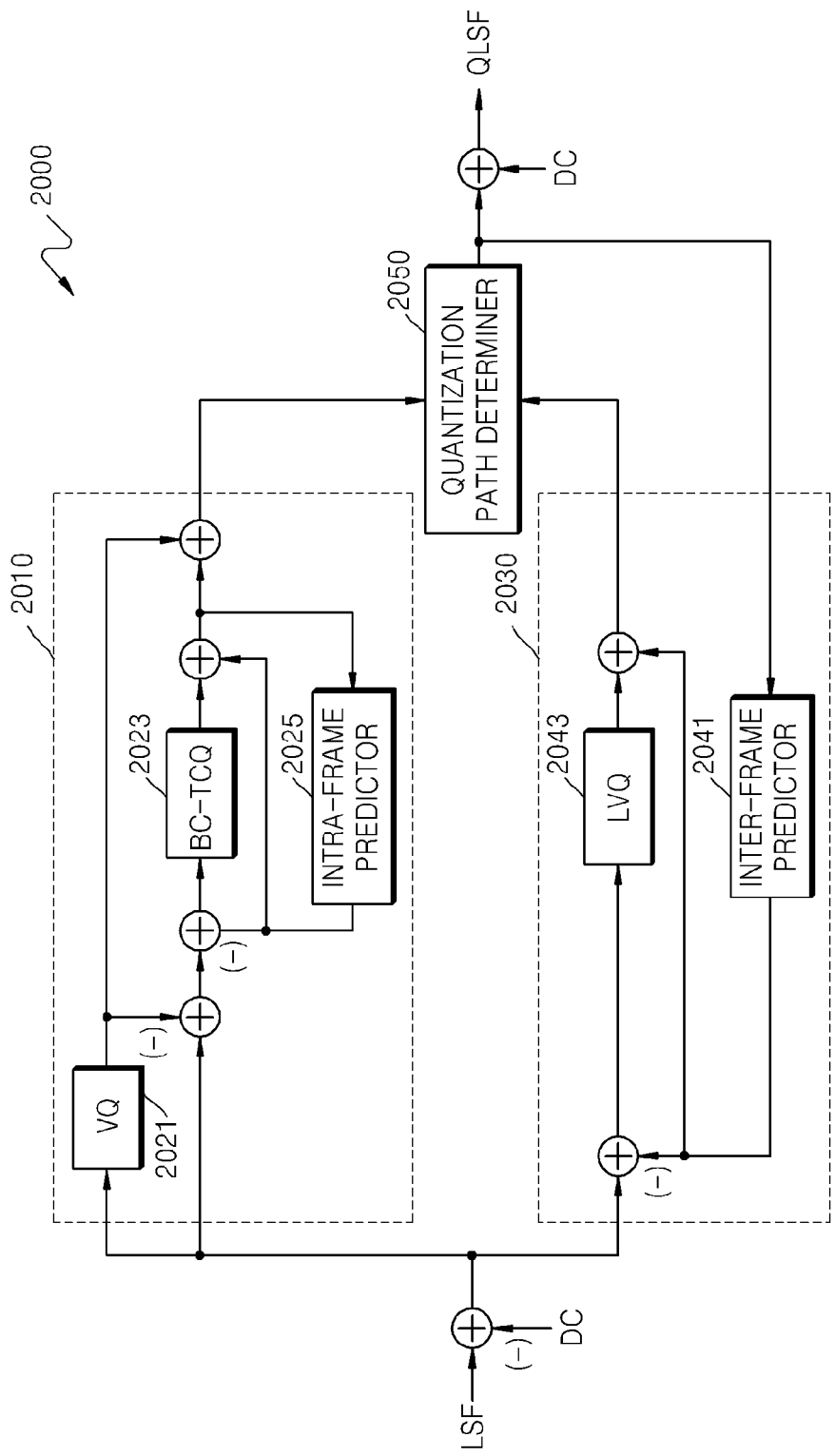
FIG. 20 is a block diagram of an LPC coefficient quantizer according to another exemplary embodiment.

FIG. 20 is a block diagram of an LPC coefficient quantizer according to another exemplary embodiment.

Referring to FIG. 20, the LPC coefficient quantizer 2000 may include a first quantization scheme 2010, a second quantization scheme 2030, and a quantization path determiner 2050.

The first quantization scheme 2010 performs quantization without using the inter-frame prediction and may use a combination of a VQ 2021 and a BC-TCQ 2023 having an intra-frame predictor 2025 for quantization performance improvement.

The second quantization scheme 2030 performs quantization using the inter-frame prediction and may include an LVQ 2043 and an inter-frame predictor 2041.

The quantization path determiner 2050 determines a quantization path by receiving a prediction mode and weighted distortion using optimally quantized values obtained by the first quantization scheme 2010 and the second quantization scheme 2030.

For example, when 43 bits are used in the LPC coefficient quantizer 2000 to quantize a speech signal in the VC mode with a WB of 8-KHz, 6 bits and 36 bits may be allocated to the VQ 2021 and the BC-TCQ 2023 of the first quantization scheme 2010, respectively, except for 1 bit indicating quantization path information. In addition, 42 bits may be allocated to the LVQ 2043 of the second quantization scheme 2030 except for 1 bit indicating quantization path information.

Table 6 shows an example in which bits are allocated to a WB speech signal of an 8-KHz band.

TABLE 6

| Coding mode | LSF/ISF quantization scheme | MSVQ-LVQ [bits] | BC-TCQ [bits] |
| --- | --- | --- | --- |
| VC, WB | Safety-net | — | 43 |
|  | Predictive | 43 | — |

Figure 21:
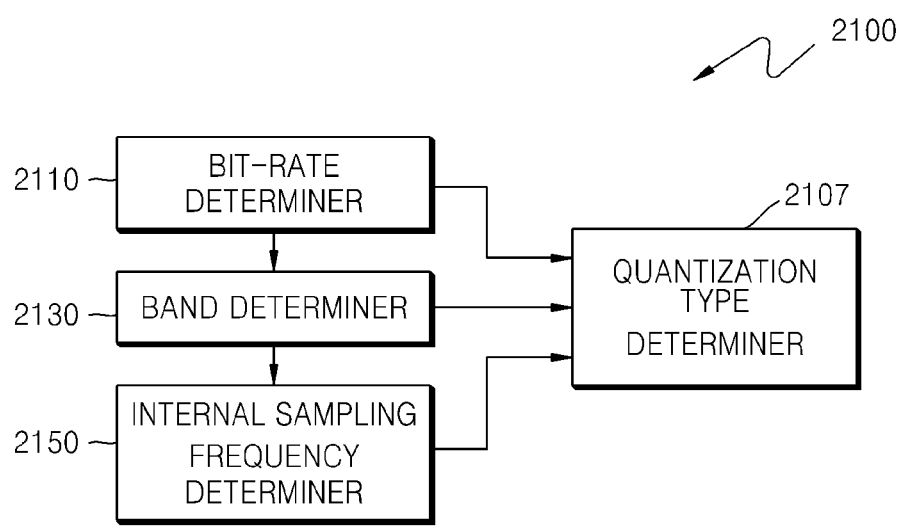
FIG. 21 is a block diagram of a quantizer type selector according to an exemplary embodiment.

FIG. 21 is a block diagram of quantizer type selector according to an exemplary embodiment. The quantizer type selector 2100 shown in FIG. 21 may include a bit-rate determiner 2110, a bandwidth determiner 2130, an internal sampling frequency determiner 2150, and a quantizer type determiner 2107. Each of the components may be implemented by at least one processor (e.g., a central processing unit (CPU)) by being integrated in at least one module. The quantizer type selector 2100 may be used in a prediction mode 2 in which two quantization schemes are switched. The quantizer type selector 2100 may be included as a component of the LPC coefficient quantizer 117 of the sound encoding apparatus 100 of FIG. 1 or a component of the sound encoding apparatus 100 of FIG. 1.

Referring to FIG. 21, the bit-rate determiner 2110 determines a coding bit rate of a speech signal. The coding bit rate may be determined for all frames or in a frame unit. A quantizer type may be changed depending on the coding bit rate.

The bandwidth determiner 2130 determines a bandwidth of the speech signal. The quantizer type may be changed depending on the bandwidth of the speech signal.

The internal sampling frequency determiner 2150 determines an internal sampling frequency based on an upper limit of a bandwidth used in a quantizer. When the bandwidth of the speech signal is equal to or wider than a WB, i.e., the WB, an SWB, or an FB, the internal sampling frequency varies according to whether the upper limit of the coding bandwidth is 6.4 KHz or 8 KHz. If the upper limit of the coding bandwidth is 6.4 KHz, the internal sampling frequency is 12.8 KHz, and if the upper limit of the coding bandwidth is 8 KHz, the internal sampling frequency is 16 KHz. The upper limit of the coding bandwidth is not limited thereto.

The quantizer type determiner 2107 selects one of an open-loop and a closed-loop as the quantizer type by receiving an output of the bit-rate determiner 2110, an output of the bandwidth determiner 2130, and an output of the internal sampling frequency determiner 2150. The quantizer type determiner 2107 may select the open-loop as the quantizer type when the coding bit rate is greater than a predetermined reference value, the bandwidth of the voice signal is equal to or wider than the WB, and the internal sampling frequency is 16 KHz. Otherwise, the closed-loop may be selected as the quantizer type.

Figure 22:
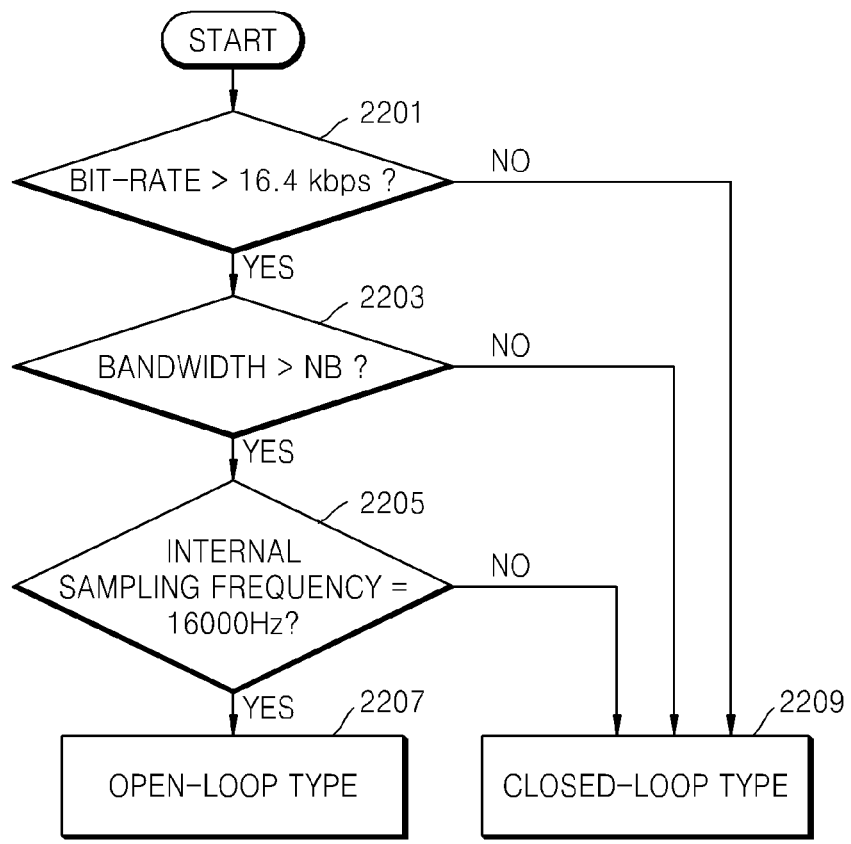
FIG. 22 is a flowchart illustrating an operation of a quantizer type selecting method, according to an exemplary embodiment.

FIG. 22 is a flowchart illustrating a method of selecting a quantizer type, according to an exemplary embodiment.

Referring to FIG. 22, in operation 2201, it is determined whether a bit rate is greater than a reference value. The reference value is set to 16.4 Kbps in FIG. 22 but is not limited thereto. As a result of the determination in operation 2201, if the bit rate is equal to or less than the reference value, a closed-loop type is selected in operation 2209.

As a result of the determination in operation 2201, if the bit rate is greater than the reference value, it is determined in operation 2203 whether a bandwidth of an input signal is wider than an NB. As a result of the determination in operation 2203, if the bandwidth of the input signal is the NB, the closed-loop type is selected in operation 2209.

As a result of the determination in operation 2203, if the bandwidth of the input signal is wider than the NB, i.e., if the bandwidth of the input signal is a WB, an SWB, or an FB, it is determined in operation 2205 whether an internal sampling frequency is a certain frequency. For example, in FIG. 22 the certain frequency is set to 16 KHz. As a result of the determination in operation 2205, if the internal sampling frequency is not the certain reference frequency, the closed-loop type is selected in operation 2209.

As a result of the determination in operation 2205, if the internal sampling frequency is 16 KHz, an open-loop type is selected in operation 2207.

Figure 23:
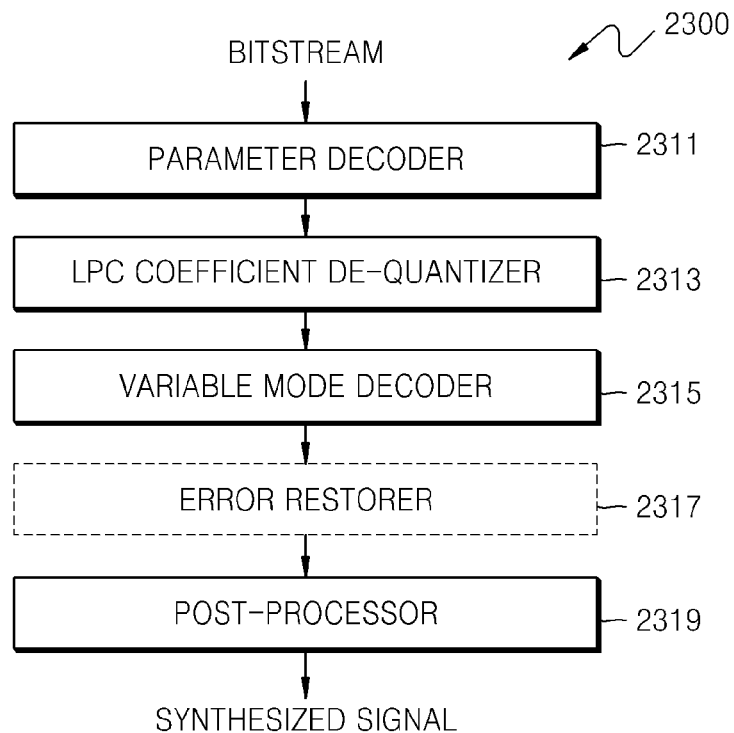
FIG. 23 is a block diagram of a sound decoding apparatus according to an exemplary embodiment.

FIG. 23 is a block diagram of a sound decoding apparatus according to an exemplary embodiment.

Referring to FIG. 23, the sound decoding apparatus 2300 may include a parameter decoder 2311, an LPC coefficient inverse quantizer 2313, a variable mode decoder 2315, and a post-processor 2319. The sound decoding apparatus 2300 may further include an error restorer 2317. Each of the components of the sound decoding apparatus 2300 may be implemented by at least one processor (e.g., a central processing unit (CPU)) by being integrated in at least one module.

The parameter decoder 2311 may decode parameters to be used for decoding from a bitstream. When a coding mode is included in the bitstream, the parameter decoder 2311 may decode the coding mode and parameters corresponding to the coding mode. LPC coefficient inverse quantization and excitation decoding may be performed in correspondence with the decoded coding mode.

The LPC coefficient inverse quantizer 2313 may generate decoded LSF coefficients by inverse quantizing quantized ISF or LSF coefficients, quantized ISF or LSF quantization errors or quantized ISF or LSF predictive errors included in LPC parameters and generates LPC coefficients by converting the decoded LSF coefficients.

The variable mode decoder 2315 may generate a synthesized signal by decoding the LPC coefficients generated by the LPC coefficient inverse quantizer 2313. The variable mode decoder 2315 may perform the decoding in correspondence with the coding modes as shown in FIGS. 2A to 2D according to encoding apparatuses corresponding to decoding apparatuses.

The error restorer 2317, if included, may restore or conceal a current frame of a speech signal when errors occur in the current frame as a result of the decoding of the variable mode decoder 2315.

The post-processor (e.g., a central processing unit (CPU)) 2319 may generate a final synthesized signal, i.e., a restored sound, by performing various kinds of filtering and speech quality improvement processing of the synthesized signal generated by the variable mode decoder 2315.

Figure 24:
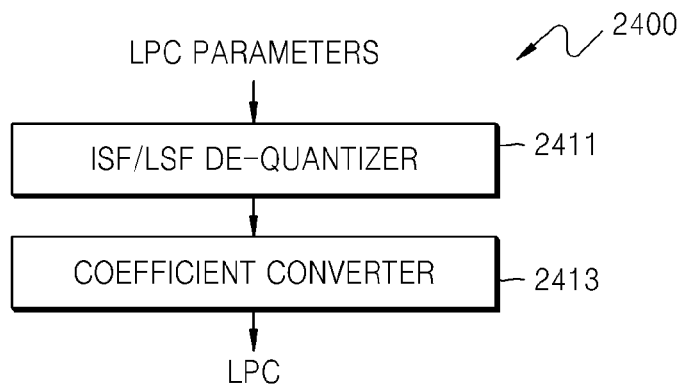
FIG. 24 is a block diagram of an LPC coefficient inverse quantizer according to an exemplary embodiment.

FIG. 24 is a block diagram of an LPC coefficient inverse quantizer according to an exemplary embodiment.

Referring to FIG. 24, the LPC coefficient inverse quantizer 2400 may include an ISF/LSF inverse quantizer 2411 and a coefficient converter 2413.

The ISF/LSF inverse quantizer 2411 may generate decoded ISF or LSF coefficients by inverse quantizing quantized ISF or LSF coefficients, quantized ISF or LSF quantization errors, or quantized ISF or LSF predictive errors included in LPC parameters in correspondence with quantization path information included in a bitstream.

The coefficient converter 2413 may convert the decoded ISF or LSF coefficients obtained as a result of the inverse quantization by the ISF/LSF inverse quantizer 2411 to Immittance Spectral Pairs (ISPs) or Linear Spectral Pairs (LSPs) and performs interpolation for each subframe. The interpolation may be performed by using ISPs/LSPs of a previous frame and ISPs/LSPs of a current frame. The coefficient converter 2413 may convert the inverse-quantized and interpolated ISPs/LSPs of each subframe to LSP coefficients.

Figure 25:
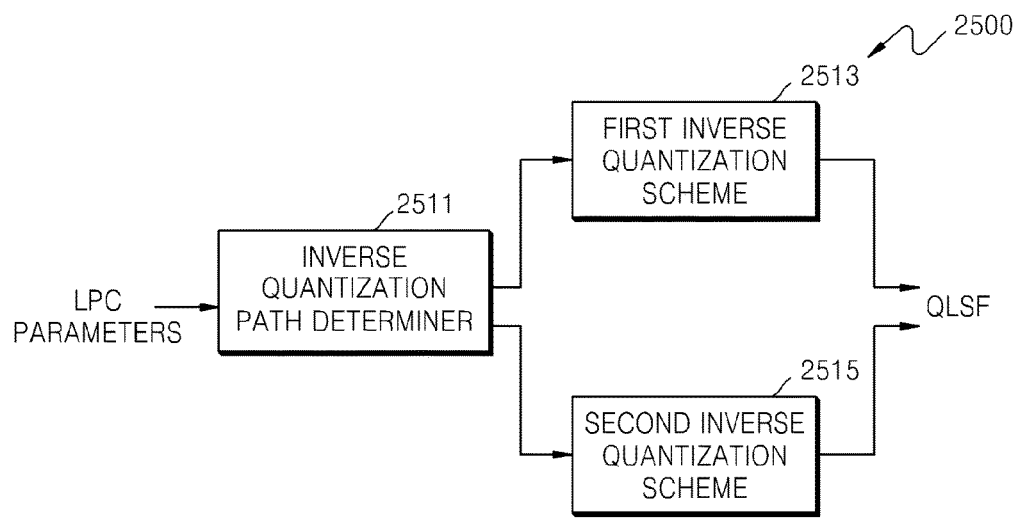
FIG. 25 is a block diagram of an LPC coefficient inverse quantizer according to another exemplary embodiment.

FIG. 25 is a block diagram of an LPC coefficient inverse quantizer according to another exemplary embodiment.

Referring to FIG. 25, the LPC coefficient inverse quantizer 2500 may include an inverse quantization path determiner 2511, a first inverse quantization scheme 2513, and a second inverse quantization scheme 2515.

The inverse quantization path determiner 2511 may provide LPC parameters to one of the first inverse quantization scheme 2513 and the second inverse quantization scheme 2515 based on quantization path information included in a bitstream. For example, the quantization path information may be represented by 1 bit.

The first inverse quantization scheme 2513 may include an element for roughly inverse quantizing the LPC parameters and an element for precisely inverse quantizing the LPC parameters.

The second inverse quantization scheme 2515 may include an element for performing block-constrained trellis-coded inverse quantization and an inter-frame predictive element with respect to the LPC parameters.

The first inverse quantization scheme 2513 and the second inverse quantization scheme 2515 are not limited to the current exemplary embodiment and may be implemented by using inverse processes of the first and second quantization schemes of the above described exemplary embodiments according to encoding apparatuses corresponding to decoding apparatuses.

A configuration of the LPC coefficient inverse quantizer 2500 may be applied regardless of whether a quantization method is an open-loop type or a closed-loop type.

Figure 26:
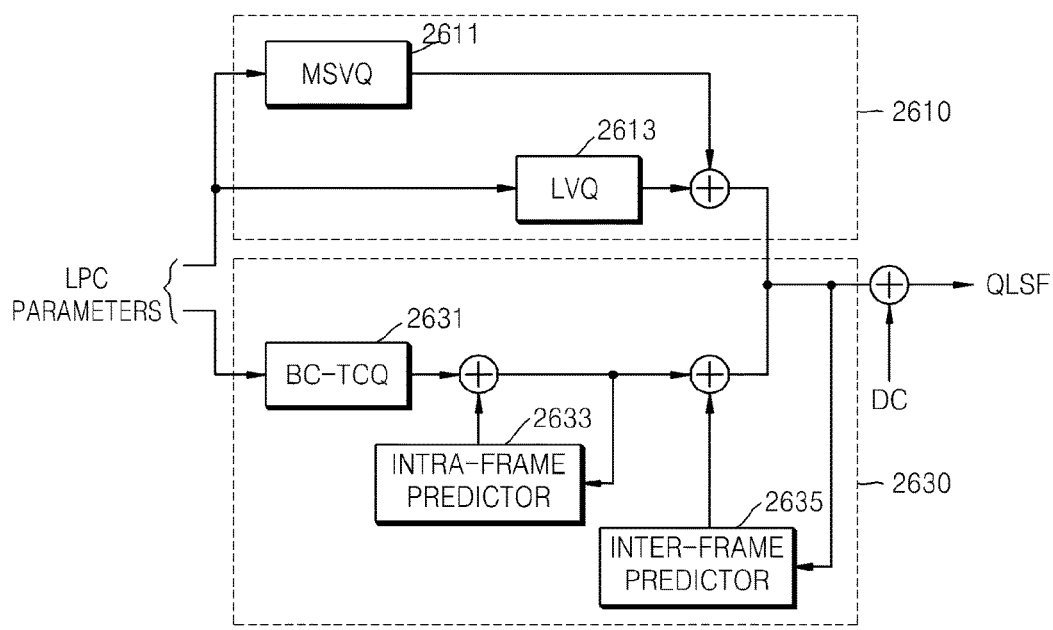
FIG. 26 is a block diagram of an example of a first inverse quantization scheme and a second inverse quantization scheme in the LPC coefficient inverse quantizer of FIG. 25, according to an exemplary embodiment.

FIG. 26 is a block diagram of the first inverse quantization scheme 2513 and the second inverse quantization scheme 2515 in the LPC coefficient inverse quantizer 2500 of FIG. 25, according to an exemplary embodiment.

Referring to FIG. 26, a first inverse quantization scheme 2610 may include a Multi-Stage Vector Inverse Quantizer (MSVIQ) 2611 for inverse quantizing quantized LSF coefficients included in LPC parameters by using a first codebook index generated by an MSVQ (not shown) of an encoding end (not shown) and a Lattice Vector Inverse Quantizer (LVIQ) 2613 for inverse quantizing LSF quantization errors included in LPC parameters by using a second codebook index generated by an LVQ (not shown) of the encoding end. Final decoded LSF coefficients are generated by adding the inverse-quantized LSF coefficients obtained by the MSVIQ 2611 and the inverse-quantized LSF quantization errors obtained by the LVIQ 2613 and then adding a mean value, which is a predetermined DC value, to the addition result.

A second inverse quantization scheme 2630 may include a Block-Constrained Trellis-Coded Inverse Quantizer (BC-TCIQ) 2631 for inverse quantizing LSF predictive errors included in the LPC parameters by using a third codebook index generated by a BC-TCQ (not shown) of the encoding end, an intra-frame predictor 2633, and an inter-frame predictor 2635. The inverse quantization process starts from the lowest vector from among LSF vectors, and the intra-frame predictor 2633 generates a predictive value for a subsequent vector element by using a decoded vector. The inter-frame predictor 2635 generates predictive values through inter-frame prediction by using LSF coefficients decoded in a previous frame. Final decoded LSF coefficients are generated by adding the LSF coefficients obtained by the BC-TCIQ 2631 and the intra-frame predictor 2633 and the predictive values generated by the inter-frame predictor 2635 and then adding a mean value, which is a predetermined DC value, to the addition result.

The first inverse quantization scheme 2610 and the second inverse quantization scheme 2630 are not limited to the current exemplary embodiment and may be implemented by using inverse processes of the first and second quantization schemes of the above-described exemplary embodiments according to encoding apparatuses corresponding to decoding apparatuses.

Figure 27:
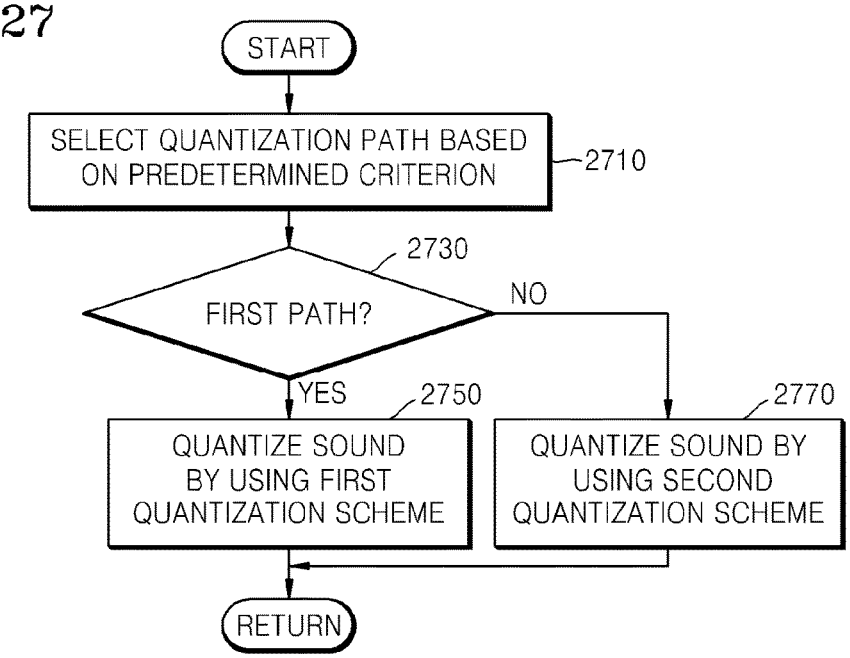
FIG. 27 is a flowchart illustrating a quantizing method according to an exemplary embodiment.

FIG. 27 is a flowchart illustrating a quantizing method according to an exemplary embodiment.

Referring to FIG. 27, in operation 2710, a quantization path of a received sound is determined based on a predetermined criterion before quantization of the received sound. In an exemplary embodiment, one of a first path not using inter-frame prediction and a second path using the inter-frame prediction may be determined.

In operation 2730, a quantization path determined from among the first path and the second path is checked.

If the first path is determined as the quantization path as a result of the checking in operation 2730, the received sound is quantized using a first quantization scheme in operation 2750.

On the other hand, if the second path is determined as the quantization path as a result of the checking in operation 2730, the received sound is quantized using a second quantization scheme in operation 2770.

The quantization path determination process in operation 2710 may be performed through the various exemplary embodiments described above. The quantization processes in operations 2750 and 2770 may be performed by using the various exemplary embodiments described above and the first and second quantization schemes, respectively.

Although the first and second paths are set as selectable quantization paths in the current exemplary embodiment, a plurality of paths including the first and second paths may be set, and the flowchart of FIG. 27 may be changed in correspondence with the plurality of set paths.

Figure 28:
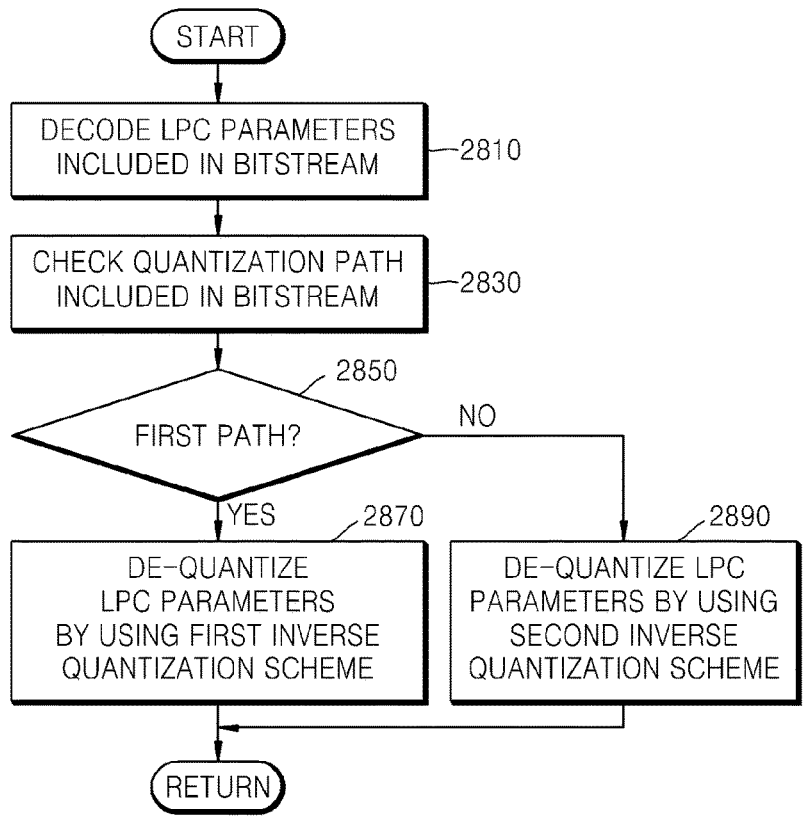
FIG. 28 is a flowchart illustrating an inverse quantizing method according to an exemplary embodiment.

FIG. 28 is a flowchart illustrating an inverse quantizing method according to an exemplary embodiment.

Referring to FIG. 28, in operation 2810, LPC parameters included in a bitstream are decoded.

In operation 2830, a quantization path included in the bitstream is checked, and it is determined in operation 2850 whether the checked quantization path is a first path or a second path.

If the quantization path is the first path as a result of the determination in operation 2850, the decoded LPC parameters are inverse quantized by using a first inverse quantization scheme in operation 2870.

If the quantization path is the second path as a result of the determination in operation 2850, the decoded LPC parameters are inverse quantized by using a second inverse quantization scheme in operation 2890.

The inverse quantization processes in operations 2870 and 2890 may be performed by using inverse processes of the first and second quantization schemes of the various exemplary embodiments described above, respectively, according to encoding apparatuses corresponding to decoding apparatuses.

Although the first and second paths are set as the checked quantization paths in the current exemplary embodiment, a plurality of paths including the first and second paths may be set, and the flowchart of FIG. 28 may be changed in correspondence with the plurality of set paths.

The methods of FIGS. 27 and 28 may be programmed and may be performed by at least one processing device. In addition, the exemplary embodiments may be performed in a frame unit or a sub-frame unit.

Figure 29:
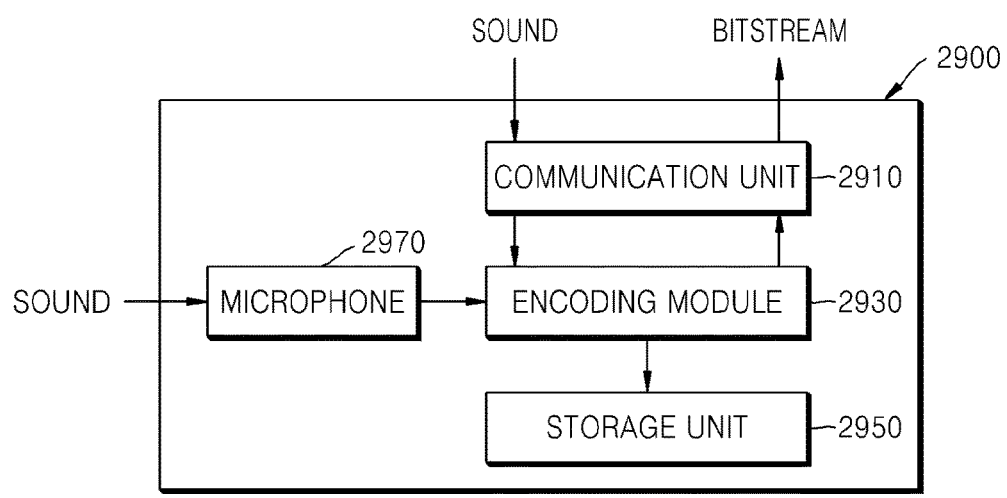
FIG. 29 is a block diagram of an electronic device including an encoding module, according to an exemplary embodiment.

FIG. 29 is a block diagram of an electronic device including an encoding module, according to an exemplary embodiment.

Referring to FIG. 29, the electronic device 2900 may include a communication unit 2910 and the encoding module 2930. In addition, the electronic device 2900 may further include a storage unit 2950 for storing a sound bitstream obtained as a result of encoding according to the usage of the sound bitstream. In addition, the electronic device 2900 may further include a microphone 2970. That is, the storage unit 2950 and the microphone 2970 may be optionally included. The electronic device 2900 may further include an arbitrary decoding module (not shown), e.g., a decoding module for performing a general decoding function or a decoding module according to an exemplary embodiment. The encoding module 2930 may be implemented by at least one processor (e.g., a central processing unit (CPU)) (not shown) by being integrated with other components (not shown) included in the electronic device 2900 as one body.

The communication unit 2910 may receive at least one of a sound or an encoded bitstream provided from the outside or transmit at least one of a decoded sound or a sound bitstream obtained as a result of encoding by the encoding module 2930.

The communication unit 2910 is configured to transmit and receive data to and from an external electronic device via a wireless network, such as wireless Internet, wireless intranet, a wireless telephone network, a wireless Local Area Network (WLAN), Wi-Fi, Wi-Fi Direct (WFD), third generation (3G), fourth generation (4G), Bluetooth, Infrared Data Association (IrDA), Radio Frequency Identification (RFID), Ultra WideBand (UWB), Zigbee, or Near Field Communication (NFC), or a wired network, such as a wired telephone network or wired Internet.

The encoding module 2930 may generate a bitstream by selecting one of a plurality of paths, including a first path not using inter-frame prediction and a second path using the inter-frame prediction, as a quantization path of a sound provided through the communication unit 2910 or the microphone 2970 based on a predetermined criterion before quantization of the sound, quantizing the sound by using one of a first quantization scheme and a second quantization scheme according to the selected quantization path, and encoding the quantized sound.

The first quantization scheme may include a first quantizer (not shown) for roughly quantizing the sound and a second quantizer (not shown) for precisely quantizing a quantization error signal between the sound and an output signal of the first quantizer. The first quantization scheme may include an MSVQ (not shown) for quantizing the sound and an LVQ (not shown) for quantizing a quantization error signal between the sound and an output signal of the MSVQ. In addition, the first quantization scheme may be implemented by one of the various exemplary embodiments described above.

The second quantization scheme may include an inter-frame predictor (not shown) for performing the inter-frame prediction of the sound, an intra-frame predictor (not shown) for performing intra-frame prediction of predictive errors, and a BC-TCQ (not shown) for quantizing the predictive errors. Likewise, the second quantization scheme may be implemented by one of the various exemplary embodiments described above.

The storage unit 2950 may store an encoded bitstream generated by the encoding module 2930. The storage unit 2950 may store various programs necessary to operate the electronic device 2900.

The microphone 2970 may provide a sound of a user outside to the encoding module 2930.

Figure 30:
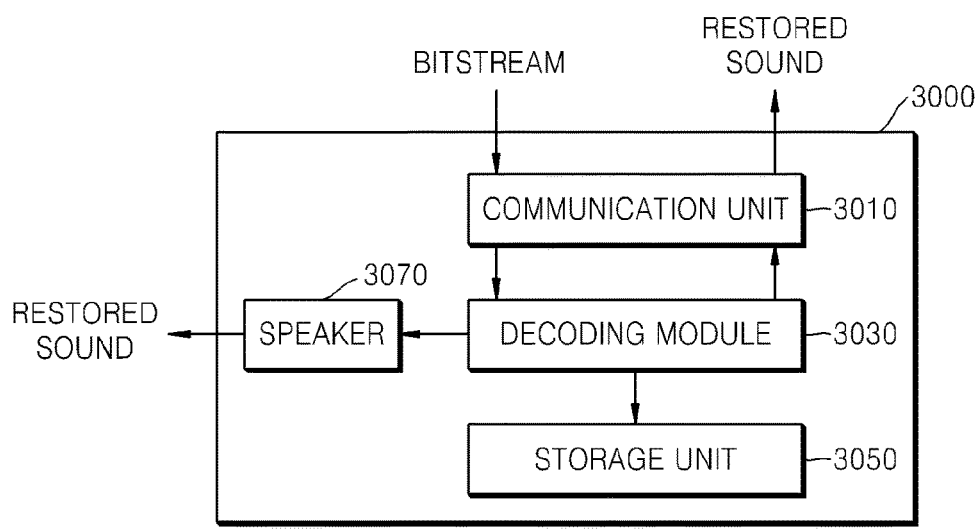
FIG. 30 is a block diagram of an electronic device including a decoding module, according to an exemplary embodiment.

FIG. 30 is a block diagram of an electronic device including a decoding module, according to an exemplary embodiment.

Referring to FIG. 30, the electronic device 3000 may include a communication unit 3010 and the decoding module 3030. In addition, the electronic device 3000 may further include a storage unit 3050 for storing a restored sound obtained as a result of decoding according to the usage of the restored sound. In addition, the electronic device 3000 may further include a speaker 3070. That is, the storage unit 3050 and the speaker 3070 may be optionally included. The electronic device 3000 may further include an arbitrary encoding module (not shown), e.g., an encoding module for performing a general encoding function or an encoding module according to an exemplary embodiment of the present invention. The decoding module 3030 may be implemented by at least one processor (e.g., a central processing unit (CPU)) (not shown) by being integrated with other components (not shown) included in the electronic device 3000 as one body.

The communication unit 3010 may receive at least one of a sound or an encoded bitstream provided from the outside or transmit at least one of a restored sound obtained as a result of decoding of the decoding module 3030 or a sound bitstream obtained as a result of encoding. The communication unit 3010 may be substantially implemented as the communication unit 2910 of FIG. 29.

The decoding module 3030 may generate a restored sound by decoding LPC parameters included in a bitstream provided through the communication unit 3010, inverse quantizing the decoded LPC parameters by using one of a first inverse quantization scheme not using the inter-frame prediction and a second inverse quantization scheme using the inter-frame prediction based on path information included in the bitstream, and decoding the inverse-quantized LPC parameters in the decoded coding mode. When a coding mode is included in the bitstream, the decoding module 3030 may decode the inverse-quantized LPC parameters in a decoded coding mode.

The first inverse quantization scheme may include a first inverse quantizer (not shown) for roughly inverse quantizing the LPC parameters and a second inverse quantizer (not shown) for precisely inverse quantizing the LPC parameters. The first inverse quantization scheme may include an MSVIQ (not shown) for inverse quantizing the LPC parameters by using a first codebook index and an LVIQ (not shown) for inverse quantizing the LPC parameters by using a second codebook index. In addition, since the first inverse quantization scheme performs an inverse operation of the first quantization scheme described in FIG. 29, the first inverse quantization scheme may be implemented by one of the inverse processes of the various exemplary embodiments described above corresponding to the first quantization scheme according to encoding apparatuses corresponding to decoding apparatuses.

The second inverse quantization scheme may include a BC-TCIQ (not shown) for inverse quantizing the LPC parameters by using a third codebook index, an intra-frame predictor (not shown), and an inter-frame predictor (not shown). Likewise, since the second inverse quantization scheme performs an inverse operation of the second quantization scheme described in FIG. 29, the second inverse quantization scheme may be implemented by one of the inverse processes of the various exemplary embodiments described above corresponding to the second quantization scheme according to encoding apparatuses corresponding to decoding apparatuses.

The storage unit 3050 may store the restored sound generated by the decoding module 3030. The storage unit 3050 may store various programs for operating the electronic device 3000.

The speaker 3070 may output the restored sound generated by the decoding module 3030 to the outside.

Figure 31:
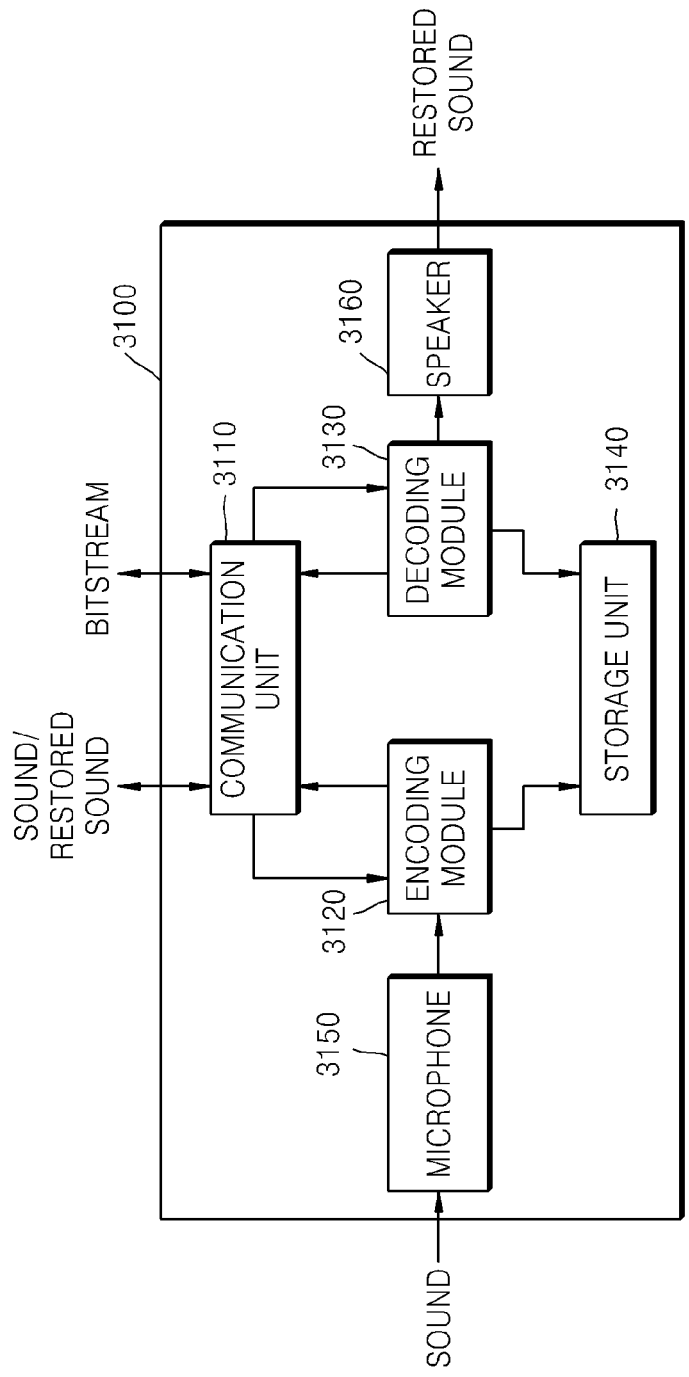
FIG. 31 is a block diagram of an electronic device including an encoding module and a decoding module, according to an exemplary embodiment.

FIG. 31 is a block diagram of an electronic device including an encoding module and a decoding module, according to an exemplary embodiment.

The electronic device 3100 shown in FIG. 31 may include a communication unit 3110, an encoding module 3120, and a decoding module 3130. In addition, the electronic device 3100 may further include a storage unit 3140 for storing a sound bitstream obtained as a result of encoding or a restored sound obtained as a result of decoding according to the usage of the sound bitstream or the restored sound. In addition, the electronic device 3100 may further include a microphone 3150 and/or a speaker 3160. The encoding module 3120 and the decoding module 3130 may be implemented by at least one processor (e.g., a central processing unit (CPU)) (not shown) by being integrated with other components (not shown) included in the electronic device 3100 as one body.

Since the components of the electronic device 3100 shown in FIG. 31 correspond to the components of the electronic device 2900 shown in FIG. 29 or the components of the electronic device 3000 shown in FIG. 30, a detailed description thereof is omitted.

Each of the electronic devices 2900, 3000, and 3100 shown in FIGS. 29, 30, and 31 may include a voice communication only terminal, such as a telephone or a mobile phone, a broadcasting or music only device, such as a TV or an MP3 player, or a hybrid terminal device of a voice communication only terminal and a broadcasting or music only device but are not limited thereto. In addition, each of the electronic devices 2900, 3000, and 3100 may be used as a client, a server, or a transducer displaced between a client and a server.

When the electronic device 2900, 3000, or 3100 is, for example, a mobile phone, although not shown, the electronic device 2900, 3000, or 3100 may further include a user input unit, such as a keypad, a display unit for displaying information processed by a user interface or the mobile phone, and a processor (e.g., a central processing unit (CPU)) for controlling the functions of the mobile phone. In addition, the mobile phone may further include a camera unit having an image pickup function and at least one component for performing a function for the mobile phone.

When the electronic device 2900, 3000, or 3100 is, for example, a TV, although not shown, the electronic device 2900, 3000, or 3100 may further include a user input unit, such as a keypad, a display unit for displaying received broadcasting information, and a processor (e.g., a central processing unit (CPU)) for controlling all functions of the TV. In addition, the TV may further include at least one component for performing a function of the TV.

BC-TCQ related contents embodied in association with quantization/inverse quantization of LPC coefficients are disclosed in detail in U.S. Pat. No. 7,630,890 (Block-constrained TCQ method, and method and apparatus for quantizing LSF parameter employing the same in speech coding system). The contents in association with an LVA method are disclosed in detail in US Patent Application No. 20070233473 (Multi-path trellis coded quantization method and Multi-path trellis coded quantizer using the same). The contents of U.S. Pat. No. 7,630,890 and US Patent Application No. 20070233473 are herein incorporated by reference.

According to the present inventive concept, to efficiently quantize an audio or a speech signal, by applying a plurality of coding modes according to characteristics of the audio or speech signal and allocating various numbers of bits to the audio or speech signal according to a compression ratio applied to each of the coding modes, an optimal quantizer with low complexity may be selected in each of the coding modes.

The quantizing method, the inverse quantizing method, the encoding method, and the decoding method according to the exemplary embodiments can be written as computer programs and can be implemented in general-use digital computers that execute the programs using a computer-readable recording medium. In addition, a data structure, a program command, or a data file available in the exemplary embodiments may be recorded in the computer-readable recording medium in various manners. The computer-readable recording medium is any data storage device that can store data which can be thereafter read by a computer system. Examples of the computer-readable recording medium include magnetic recording media, such as hard disks, floppy disks, and magnetic tapes, optical recording media, such as CD-ROMs and DVDs, magneto-optical recording media, such as floptical disks, and hardware devices, such as ROM, RAM, and flash memories, particularly configured to store and execute a program command. The computer-readable recording medium may also be a transmission medium for transmitting a signal in which a program command and a data structure are designated. Examples of the program command may include machine language codes created by a compiler and high-level language codes executable by a computer through an interpreter.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims.

What is claimed is:

1. A decoding method comprising:
   selecting, based on a parameter from a bitstream including at least one of an encoded audio signal and an encoded speech signal, one of a first decoding scheme without inter-frame prediction and a second decoding scheme with the inter-frame prediction; and
   decoding, performed by a processor, the bitstream, based on the selected decoding scheme, for reconstruction of audio or speech,
   wherein the first decoding scheme comprises a trellis-structured de-quantizer with block constraints and an intra-frame predictor,
   wherein both the first decoding scheme and the second decoding scheme are configured to perform decoding by using an identical number of bits per frame, and
   wherein the bitstream is obtained based on a voiced coding mode from among a plurality of coding modes.

2. The method of claim 1, wherein the second decoding scheme comprises a trellis-structured de-quantizer with block constraints, an intra-frame predictor and an inter-frame predictor.

3. A decoding method comprising:
   selecting, based on a parameter from a bitstream including at least one of an encoded audio signal and an encoded speech signal, one of a first decoding scheme without inter-frame prediction and a second decoding scheme with the inter-frame prediction; and
   decoding, performed by a processor, the bitstream, based on the selected decoding scheme, for reconstruction of audio or speech,
   wherein the first decoding scheme comprises a trellis-structured de-quantizer with block constraints, an intra-frame predictor and a vector de-quantizer,
   wherein both the first decoding scheme and the second decoding scheme are configured to perform decoding by using an identical number of bits per frame, and
   wherein the bitstream is obtained based on a voiced coding mode from among a plurality of coding modes.

4. The method of claim 3, wherein the second decoding scheme comprises a trellis-structured de-quantizer with block constraints, an intra-frame predictor, an inter-frame predictor and a vector de-quantizer.

* * * * *